(12) United States Patent
Oda et al.

(10) Patent No.: US 11,955,205 B2
(45) Date of Patent: Apr. 9, 2024

(54) THERMOSENSITIVE DEFORMATION APPARATUS

(75) Inventors: Yoshimitsu Oda, Suita (JP); Masaaki Ishio, Osaka (JP)

(73) Assignee: PROTERIAL, LTD., Tokyo (JP)

( * ) Notice: Subject to any disclaimer, the term of this patent is extended or adjusted under 35 U.S.C. 154(b) by 383 days.

(21) Appl. No.: 13/375,167

(22) PCT Filed: May 21, 2010

(86) PCT No.: PCT/JP2010/058637
§ 371 (c)(1),
(2), (4) Date: Nov. 29, 2011

(87) PCT Pub. No.: WO2010/143515
PCT Pub. Date: Dec. 16, 2010

(65) Prior Publication Data
US 2012/0077056 A1    Mar. 29, 2012

(30) Foreign Application Priority Data

Jun. 11, 2009  (JP) .................................. 2009-140040

(51) Int. Cl.
*G12B 1/02* (2006.01)
*B32B 15/01* (2006.01)
(Continued)

(52) U.S. Cl.
CPC .............. *G12B 1/02* (2013.01); *B32B 15/011* (2013.01); *C22C 38/08* (2013.01); *C22C 38/12* (2013.01);
(Continued)

(58) Field of Classification Search
None
See application file for complete search history.

(56) References Cited

U.S. PATENT DOCUMENTS 2,332,416 A * 10/1943 Waltenberg ................... 428/619
3,030,699 A *  4/1962 Alban ..................... B32B 15/01
428/616
(Continued)

FOREIGN PATENT DOCUMENTS

JP       61-025090 A     2/1986
JP       61-231138 A    10/1986
(Continued)

OTHER PUBLICATIONS

Merriam-Webster definition for "cladding".*
(Continued)

*Primary Examiner* — Holly Rickman
*Assistant Examiner* — Lisa Chau
(74) *Attorney, Agent, or Firm* — WHDA, LLP

(57) ABSTRACT

A high-temperature bimetal capable of being inhibited from considerably shifting from an original position when the temperature has fallen to an ordinary temperature is provided. This high-temperature bimetal (1) includes a high thermal expansion layer (2) made of austenitic stainless steel and a low thermal expansion layer (3) made of a thermosensitive magnetic metal having a Curie point and bonded to the high thermal expansion layer. The high-temperature bimetal is employed over both a high temperature range of not less than the Curie point and a low temperature range of less than the Curie point, while an upper limit of operating temperatures in the high temperature range of not less than the Curie point is at least 500° C.

11 Claims, 6 Drawing Sheets

(51) Int. Cl.
  *C22C 38/08* (2006.01)
  *C22C 38/12* (2006.01)
  *C22C 38/40* (2006.01)
(52) U.S. Cl.
  CPC ....... *C22C 38/40* (2013.01); *Y10T 428/12465* (2015.01)

(56) References Cited

U.S. PATENT DOCUMENTS

| | | | | |
|---|---|---|---|---|
| 4,131,720 | A | * | 12/1978 | Spengler ............... B32B 15/011 428/616 |
| 4,207,381 | A | * | 6/1980 | Aisaka ................ B32B 15/011 420/120 |
| 4,414,286 | A | * | 11/1983 | Ty ............................ 428/616 |
| 5,573,860 | A | * | 11/1996 | Hirano ................. B32B 15/01 428/616 |
| 6,214,401 | B1 | * | 4/2001 | Chaput ................ A47J 27/088 126/390.1 |
| 2005/0064219 | A1 | | 3/2005 | Fraisse et al. |
| 2006/0192181 | A1 | * | 8/2006 | Fraisse et al. ............... 252/500 |
| 2007/0144634 | A1 | | 6/2007 | Miyazaki et al. |

FOREIGN PATENT DOCUMENTS

| | | | |
|---|---|---|---|
| JP | 5-23664 | U | 3/1993 |
| JP | 7-234292 | A | 9/1995 |
| JP | 2000-146702 | A | 5/2000 |
| JP | 2001-018075 | A | 1/2001 |
| JP | 2004-065942 | A | 3/2004 |
| JP | 2005-510274 | A | 4/2005 |
| JP | 2005-206944 | A | 8/2005 |
| JP | 2008-228853 | A | 10/2008 |
| JP | 2008228853 | A * | 10/2008 |

OTHER PUBLICATIONS

Merriam-Webster Definition on "employed", obtained on May 2019.*
https://www.nickel-alloys.net/invar_nickel_iron_alloy.html, obtained on May 2019.*
https://www.hightempmetals.com/techdata/hitemplnvar36data.php, obtained on May 2019.*
International Search Report of PCT/JP2010/058637, dated Aug. 24, 2010.
English translation of Office Action dated Jul. 31, 2017, issued in counterpart Indian Application No. 4922/KOLNP/2011 (6 pages).
Non-Final Office Action dated Sep. 25, 2023, issued in U.S. Appl. No. 17/513,014. (17 pages).
Marshall Brain, "Bimetallic Strip Thermometers", obtained from https://howstuffworks.com/therm2.htm, pp. 1-4, 1998-2005, cited Non-Final Office Action dated Sep. 25, 2023. (4 pages).

* cited by examiner

FIG.5

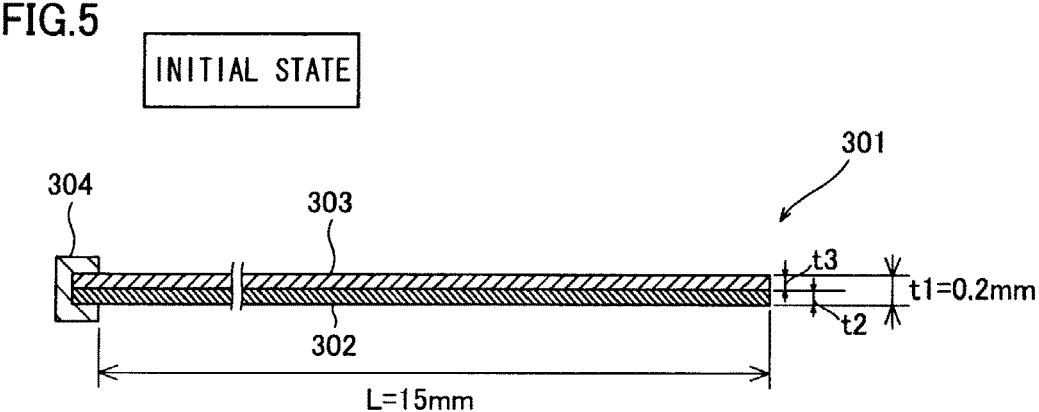

INITIAL STATE

FIG.6

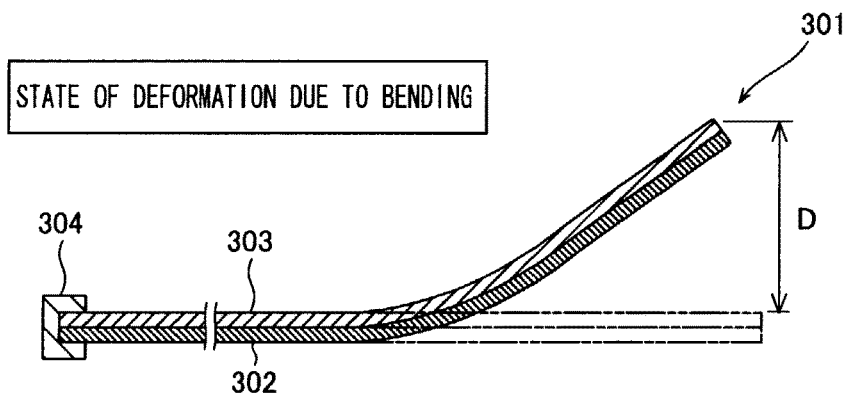

STATE OF DEFORMATION DUE TO BENDING

FIG.7

| | HIGH THERMAL EXPANSION LAYER/ LOW THERMAL EXPANSION LAYER | CURIE POINT (°C) OF LOW THERMAL EXPANSION LAYER | THERMAL EXPANSION COEFFICIENT ($\times 10^{-6}$/K) OF LOW THERMAL EXPANSION LAYER | |
|---|---|---|---|---|
| | | | LESS THAN CURIE POINT | NOT LESS THAN CURIE POINT |
| EXAMPLE 1 | 18Cr-8Ni-Fe/36Ni-6Nb-Fe | 200 | 4.1 | 15.8 |
| EXAMPLE 2 | 18Cr-8Ni-Fe/40Ni-10Cr-Fe | 200 | 8.2 | 16.8 |
| EXAMPLE 3 | 12Cr-18Ni-Fe/36Ni-2Nb-Fe | 170 | 3.0 | 15.7 |
| COMPARATIVE EXAMPLE 1 | 18Cr-8Ni-Fe/18Cr-Fe | – | 10.4 | |

THERMAL EXPANSION COEFFICIENT OF HIGH THERMAL EXPANSION LAYER 18Cr-8Ni-Fe(SUS304): $17.3 \times 10^{-6}$/K
THERMAL EXPANSION COEFFICIENT OF HIGH THERMAL EXPANSION LAYER 12Cr-18Ni-Fe (AUSTENITIC STAINLESS STEEL): $19.0 \times 10^{-6}$/K

FIG.9

|  | HIGH THERMAL EXPANSION LAYER/ LOW THERMAL EXPANSION LAYER | DISPLACEMENT D (mm) | | |
|---|---|---|---|---|
|  |  | D2(100°C) | D3(250°C) | D4(300°C) |
| EXAMPLE 1 | 18Cr-8Ni-Fe/36Ni-6Nb-Fe | 0.568 | 1.737 | 1.947 |
| EXAMPLE 2 | 18Cr-8Ni-Fe/40Ni-10Cr-Fe | 0.195 | 0.601 | 0.631 |
| EXAMPLE 3 | 12Cr-18Ni-Fe/36Ni-2Nb-Fe | 1.005 | 3.160 | 3.867 |
| COMPARATIVE EXAMPLE 1 | 18Cr-8Ni-Fe/18Cr-Fe | 0.529 | 2.036 | 2.573 |

FIG.10

|  | HIGH THERMAL EXPANSION LAYER/ LOW THERMAL EXPANSION LAYER | BENDING COEFFICIENT ($\times 10^{-6}/K$) | |
|---|---|---|---|
|  |  | LESS THAN CURIE POINT | NOT LESS THAN CURIE POINT |
| EXAMPLE 1 | 18Cr-8Ni-Fe/36Ni-6Nb-Fe | K1=6.7 | K2=3.3 |
| EXAMPLE 2 | 18Cr-8Ni-Fe/40Ni-10Cr-Fe | K1=2.3 | K2=1.1 |
| EXAMPLE 3 | 12Cr-18Ni-Fe/36Ni-2Nb-Fe | K1=11.9 | K2=6.5 |
| COMPARATIVE EXAMPLE 1 | 18Cr-8Ni-Fe/18Cr-Fe | K=6.3 | |

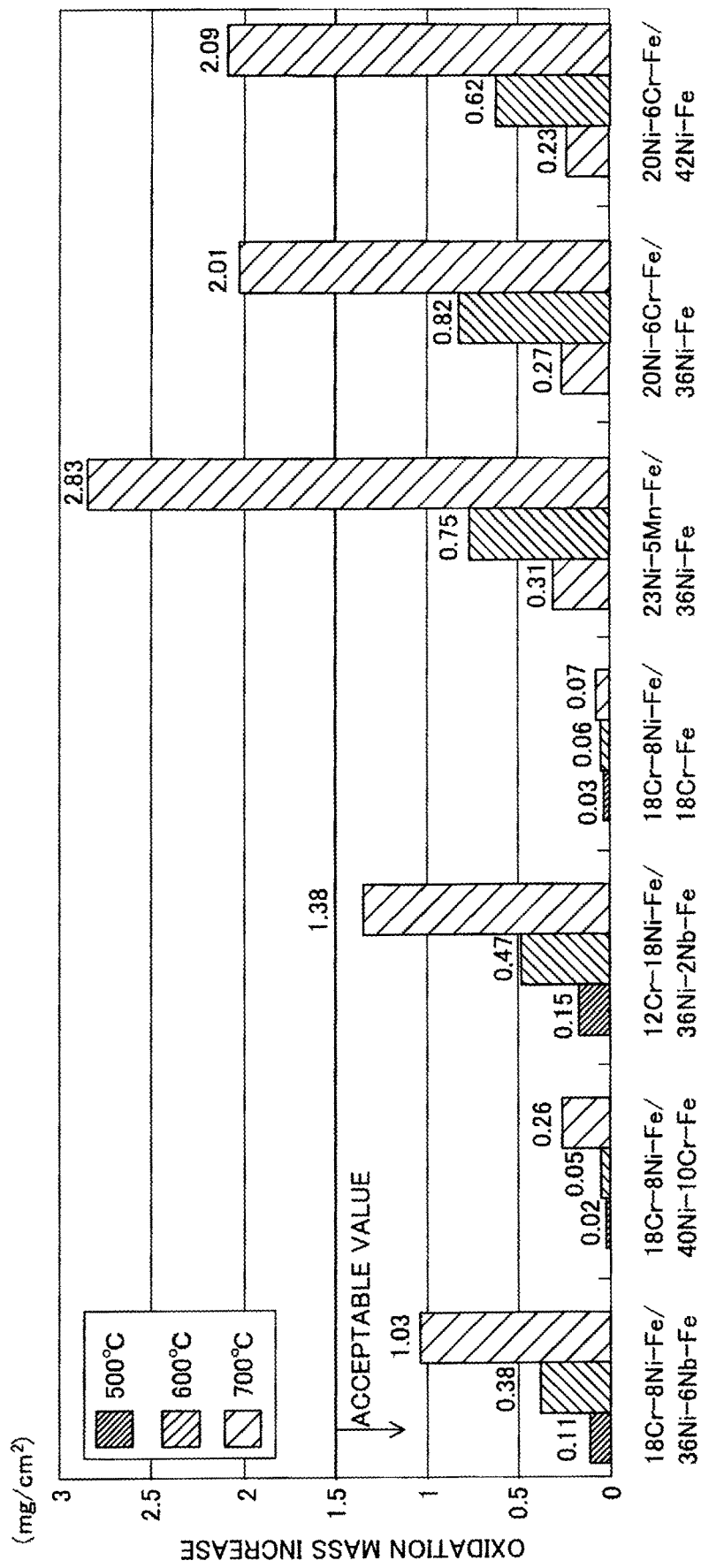

THERMOSENSITIVE DEFORMATION APPARATUS

TECHNICAL FIELD

The present invention relates to a high-temperature bimetal, and more particularly, it relates to a high-temperature bimetal including a high thermal expansion layer and a low thermal expansion layer.

BACKGROUND ART

In general, a high-temperature bimetal including a high thermal expansion layer and a low thermal expansion layer is known (refer to Patent Document 1, for example).

The aforementioned Patent Document 1 discloses a high-temperature bimetal including a sprayed layer (high thermal expansion layer) made of a 16Cr-5Al-0.3Y—Fe alloy containing 16 mass % of Cr, 5 mass % of Al, 0.3 mass % of Y, and Fe and a plurality of W lines (low thermal expansion layer) arranged parallel to each other at regular intervals, deformed by bending in response to temperature changes. The plurality of W lines of the high-temperature bimetal disclosed in this Patent Document 1 are embedded in the sprayed layer on the side closer to the upper surface in a state where the same are separated from each other with the same distance from the upper surface of the sprayed layer toward an inner portion. The high-temperature bimetal disclosed in this Patent Document 1 has a highest acceptable temperature (an upper limit of an operating temperature range) of 1200° C. and a bending coefficient of 5 to $6 \times 10^{-6}$/K. The high-temperature bimetal disclosed in this Patent Document 1 conceivably has a substantially constant bending coefficient (5 to $6 \times 10^{-6}$/K) in the whole operating temperature range.

PRIOR ART DOCUMENT

Patent Document

Patent Document 1: Japanese Patent Laying-Open No. 61-25090

SUMMARY OF THE INVENTION

Problems to be Solved by the Invention

However, the high-temperature bimetal disclosed in the aforementioned Patent Document 1 conceivably has a substantially constant bending coefficient (5 to $6 \times 10^{-6}$/K) in the whole operating temperature range. The mode of use of a bimetal include a mode where a high-temperature bimetal comes into contact with a stopper member for limiting deformation due to bending of the high-temperature bimetal within a definite range at a set temperature smaller than the highest acceptable temperature (1200° C.). In this case, the stopper member inhibits the deformation of the high-temperature bimetal in a high temperature range between the set temperature and the highest acceptable temperature. At this time, the high-temperature bimetal having a substantially constant bending coefficient in the whole operating temperature range as in the aforementioned Patent Document 1 has a large bending coefficient over the whole range of a low temperature range and the high temperature range, and hence thermal stress is easily accumulated in the high-temperature bimetal. Therefore, if the temperature falls to an ordinary temperature again after the temperature rises from the ordinary temperature to the vicinity of the highest acceptable temperature, the high-temperature bimetal disadvantageously considerably shifts from an original position at the ordinary temperature.

The present invention has been proposed in order to solve the aforementioned problem, and an object of the present invention is to provide a high-temperature bimetal capable of being inhibited from considerably shifting from an original position when the temperature has fallen to an ordinary temperature.

Means for Solving the Problems and Effect of the Invention

A high-temperature bimetal according to an aspect of the present invention includes a high thermal expansion layer made of austenitic stainless steel and a low thermal expansion layer made of a thermosensitive magnetic metal having a Curie point and bonded to the high thermal expansion layer. The high-temperature bimetal is employed over both a high temperature range of not less than the Curie point and a low temperature range of less than the Curie point, while an upper limit of operating temperatures in the high temperature range of not less than the Curie point is at least 500° C.

As hereinabove described, the high-temperature bimetal according to the aspect of the present invention has the low thermal expansion layer made of the thermosensitive magnetic metal having the Curie point and is employed over both the high temperature range of not less than the Curie point and the low temperature range of less than the Curie point, whereby a thermal expansion coefficient of the thermosensitive magnetic metal in the high temperature range of not less than the Curie point is larger than a thermal expansion coefficient of the thermosensitive magnetic metal in the low temperature range of less than the Curie point. Therefore, a difference between a thermal expansion coefficient of the high thermal expansion layer in the high temperature range and the thermal expansion coefficient of the low thermal expansion layer in the high temperature range can be rendered smaller than a difference between a thermal expansion coefficient of the high thermal expansion layer in the low temperature range and the thermal expansion coefficient of the low thermal expansion layer in the low temperature range. Thus, in the high-temperature bimetal of the present invention, deformation due to bending in the high temperature range is small compared with deformation due to bending in the low temperature range, and hence a displacement of the deformation due to bending of the high-temperature bimetal in the high temperature range of not less than the Curie point can be rendered smaller than a displacement of the deformation due to bending of the high-temperature bimetal in the low temperature range of less than the Curie point. Therefore, accumulation of thermal stress in the high-temperature bimetal can be inhibited in the high temperature range of not less than the Curie point, and hence thermal stress can be hardly accumulated in the high-temperature bimetal. Consequently, the high-temperature bimetal capable of being inhibited from considerably shifting from an original position when the temperature has fallen to the ordinary temperature can be provided.

Preferably in the aforementioned high-temperature bimetal according to the aspect, a bending coefficient in the high temperature range of not less than the Curie point is smaller than a bending coefficient in the low temperature range of less than the Curie point, when in use. According to this structure, the deformation due to bending of the high-temperature bimetal in the high temperature range of not less than the Curie point is smaller than the deformation due to bending of the high-temperature bimetal in the low temperature range of less than the Curie point, and hence accumulation of thermal stress in the high-temperature bimetal can be easily inhibited in the high temperature range of not less than the Curie point.

Preferably in the aforementioned high-temperature bimetal according to the aspect, the Curie point of the thermosensitive magnetic metal of the low thermal expansion layer is at least 100° C. and not more than 400° C., and the upper limit of the operating temperatures in the high temperature range of not less than the Curie point is at least 500° C. and not more than 700° C. According to this structure, the useful high-temperature bimetal can be obtained when it is desired to render thermal expansion small in a temperature range of at least a temperature included in at least about 100° C. and not more than 400° C. Further, the high-temperature bimetal having an upper limit of operating temperatures in a temperature range of at least 500° C. and not more than 700° C. is employed, whereby the high-temperature bimetal capable of being employed until a temperature included in at least 500° C. and not more than 700° C. and only slightly shifting from the original position when the temperature has fallen can be obtained.

Preferably in this case, a range of the operating temperatures in the high temperature range of not less than the Curie point is larger than a range of operating temperatures in the low temperature range of less than the Curie point. According to this structure, a temperature range of the high temperature range of not less than the Curie point, in which the displacement of the high-temperature bimetal is small, can be rendered larger than a temperature range of the low temperature range of less than the Curie point, in which the displacement of the high-temperature bimetal is large. Consequently, accumulation of thermal stress in the high-temperature bimetal can be further inhibited in the high temperature range of not less than the Curie point.

Preferably in the aforementioned high-temperature bimetal according to the aspect, the thermosensitive magnetic metal of the low thermal expansion layer is a Ni—Fe alloy. According to this structure, the thermosensitive magnetic metal having the Curie point can be easily obtained.

Preferably in this case, the thermosensitive magnetic metal of the low thermal expansion layer is a Ni—Fe alloy containing at least 32 mass % and not more than 45 mass % of Ni. According to this structure, the high-temperature bimetal having the Curie point of at least 100° C. and not more than 400° C. can be easily obtained.

Preferably in the aforementioned high-temperature bimetal in which the thermosensitive magnetic metal is the Ni—Fe alloy containing at least 32 mass % and not more than 45 mass % of Ni, the thermosensitive magnetic metal of the low thermal expansion layer is formed by adding at least one of Nb, Cr, Al, Si, and Ti to the Ni—Fe alloy. According to this structure, the high-temperature bimetal in which oxidation resistance is further provided to the thermosensitive magnetic metal with the Curie point of at least 100° C. and not more than 400° C. can be obtained.

Preferably in the aforementioned high-temperature bimetal in which the thermosensitive magnetic metal is formed by adding at least one of Nb, Cr, Al, Si, and Ti to the Ni—Fe alloy, the thermosensitive magnetic metal of the low thermal expansion layer is formed by adding at least 2 mass % and not more than 8 mass % of Nb to the Ni—Fe alloy. According to this structure, at least 2 mass % of Nb is added to the Ni—Fe alloy, whereby such sufficient oxidation resistance that a problem is not caused even if the temperature rises to the upper limit of the operating temperatures of the high-temperature bimetal can be provided to the thermosensitive magnetic metal. Further, a reduction in the workability of the thermosensitive magnetic metal due to an excessive increase in the strength of the thermosensitive magnetic metal by adding more than 8 mass % of Nb to the Ni—Fe alloy can be inhibited.

Preferably in the aforementioned high-temperature bimetal in which the thermosensitive magnetic metal is formed by adding at least 2 mass % and not more than 8 mass % of Nb to the Ni—Fe alloy, the thermosensitive magnetic metal of the low thermal expansion layer is formed by adding 6 mass % of Nb to a Ni—Fe alloy containing 36 mass % of Ni. According to this structure, the high-temperature bimetal being oxidation-resistant enough not to cause a problem even if the temperature rises to the upper limit of the operating temperatures of the high-temperature bimetal and having the low thermal expansion layer made of the thermosensitive magnetic metal capable of inhibiting a reduction in workability can be obtained.

Preferably in the aforementioned high-temperature bimetal in which the thermosensitive magnetic metal is formed by adding at least 2 mass % and not more than 8 mass % of Nb to the Ni—Fe alloy, the thermosensitive magnetic metal of the low thermal expansion layer is formed by adding 2 mass % of Nb to a Ni—Fe alloy containing 36 mass % of Ni. According to this structure, the high-temperature bimetal being oxidation-resistant enough not to cause a problem even if the temperature rises to the upper limit of the operating temperatures of the high-temperature bimetal and having the low thermal expansion layer made of the thermosensitive magnetic metal capable of inhibiting a reduction in workability can be obtained.

Preferably in the aforementioned high-temperature bimetal in which the thermosensitive magnetic metal is formed by adding at least one of Nb, Cr, Al, Si, and Ti to the Ni—Fe alloy, the thermosensitive magnetic metal of the low thermal expansion layer is formed by adding at least 2 mass % and not more than 13 mass % of Cr to the Ni—Fe alloy. According to this structure, at least 2 mass % of Cr is added to the Ni—Fe alloy, whereby such sufficient oxidation resistance that a problem is not caused even if the temperature rises to the upper limit of the operating temperatures of the high-temperature bimetal can be provided to the thermosensitive magnetic metal. Further, an excessive increase in the thermal expansion coefficient of the low thermal expansion layer by adding more than 13 mass % of Cr to the Ni—Fe alloy can be inhibited.

Preferably in the aforementioned high-temperature bimetal in which the thermosensitive magnetic metal is formed by adding at least 2 mass % and not more than 13 mass % of Cr to the Ni—Fe alloy, the thermosensitive magnetic-metal of the low thermal expansion layer is formed by adding 10 mass % of Cr to a Ni—Fe alloy containing 40 mass % of Ni. According to this structure, the high-temperature bimetal being oxidation-resistant enough not to cause a problem even if the temperature rises to the upper limit of the operating temperatures of the high-temperature bimetal and having the low thermal expansion layer made of the thermosensitive magnetic metal capable of inhibiting an increase in the thermal expansion coefficient can be obtained.

Preferably in the aforementioned high-temperature bimetal according to the aspect, a thickness of the low thermal expansion layer is larger than a thickness of the high thermal expansion layer. According to this structure, the high-temperature bimetal having a large bending coefficient in the low temperature range of less than the Curie point can be easily obtained.

Preferably in the aforementioned high-temperature bimetal according to the aspect, a total thickness of the high thermal expansion layer and the low thermal expansion layer increased by oxidation of the high thermal expansion layer and the low thermal expansion layer resulting from a rise in a temperature to the upper limit of the operating temperatures in the high temperature range of not less than the Curie point is not more than 1% of a total thickness of the high thermal expansion layer and the low thermal expansion layer before the oxidation of the high thermal expansion layer and the low thermal expansion layer. According to this structure, the property (bending coefficient or the like) of the high-temperature bimetal can be inhibited from changing to such an extent that a practical problem is caused by an increase in the total thickness of the high thermal expansion layer and the low thermal expansion layer by more than 1% due to the oxidation.

Preferably in this case, a total of mass increase per cubic centimeter of the high thermal expansion layer and the low thermal expansion layer increased by the oxidation is not more than 1.5 mg. According to this structure, it can be easily confirmed whether or not the total thickness of the high thermal expansion layer and the low thermal expansion layer has increased by more than 1% due to the oxidation.

Preferably in the aforementioned high-temperature bimetal according to the aspect, a thermal expansion coefficient of the low thermal expansion layer in the high temperature range of not less than the Curie point is smaller than a thermal expansion coefficient of the high thermal expansion layer and larger than a thermal expansion coefficient of the low thermal expansion layer in the low temperature range of less than the Curie point. According to this structure, the high-temperature bimetal can be inhibited from being deformed to the side closer to the high thermal expansion layer in the high temperature range of not less than the Curie point by having the low thermal expansion layer, the thermal expansion coefficient of which in the high temperature range of not less than the Curie point is equal to or larger than the thermal expansion coefficient of the high thermal expansion layer. Further, the thermal expansion coefficient of the low thermal expansion layer in the high temperature range of not less than the Curie point is larger than the thermal expansion coefficient of the low thermal expansion layer in the low temperature range of less than the Curie point, whereby the deformation due to bending of the high-temperature bimetal in the low temperature range of less than the Curie point can be inhibited from decrease.

Preferably in this case, the thermal expansion coefficient of the low thermal expansion layer in the high temperature range of not less than the Curie point is at least 70% and less than 100% of the thermal expansion coefficient of the high thermal expansion layer. According to this structure, the high-temperature bimetal can be inhibited from being deformed to the side closer to the high thermal expansion layer in the high temperature range, and the deformation due to bending of the high-temperature bimetal in the high temperature range can be inhibited from increase due to a significant difference between the thermal expansion coefficient of the high thermal expansion layer and the thermal expansion coefficient of the low thermal expansion layer in the high temperature range.

Preferably in the aforementioned high-temperature bimetal in which the thermal expansion coefficient of the low thermal expansion layer in the high temperature range is larger than the thermal expansion coefficient of the low thermal expansion layer in the low temperature range, the thermal expansion coefficient of the low thermal expansion layer in the high temperature range of not less than the Curie point is at least twice the thermal expansion coefficient of the low thermal expansion layer in the low temperature range of less than the Curie point. According to this structure, the deformation due to bending of the high-temperature bimetal in the low temperature range of less than the Curie point can be further inhibited from decrease.

Preferably in the aforementioned high-temperature bimetal according to the aspect, a thermal expansion coefficient of the low thermal expansion layer in the low temperature range of less than the Curie point is not more than 50% of a thermal expansion coefficient of the high thermal expansion layer. According to this structure, the difference between the thermal expansion coefficient of the high thermal expansion layer in the low temperature range and the thermal expansion coefficient of the low thermal expansion layer in the low temperature range can be rendered large, and hence the high-temperature bimetal in the low temperature range can be more highly deformed by bending.

Preferably in the aforementioned high-temperature bimetal according to the aspect, a first end portion of the low thermal expansion layer is fixed, and a vicinity of a second end portion of the low thermal expansion layer comes into contact with a fixed stopper member in the high temperature range of not less than the Curie point. According to this structure, the low thermal expansion layer comes into contact with the stopper member in the high temperature range of not less than the Curie point in which accumulation of thermal stress in the high-temperature bimetal is inhibited, and hence thermal stress resulting from contact with the stopper member can be hardly accumulated in the high-temperature bimetal.

Preferably in this case, the vicinity of the second end portion of the low thermal expansion layer comes into contact with the stopper member at a temperature in the high temperature range of not less than the Curie point and close to the Curie point. According to this structure, the low thermal expansion layer comes into contact with the stopper member at a temperature close to the Curie point, and hence a state where the thermal stress resulting from contact with the stopper member is hardly accumulated in the high-temperature bimetal is available over a wide temperature range.

BRIEF DESCRIPTION OF THE DRAWINGS

FIG. 5 A diagram for illustrating an initial state of measurement of a displacement conducted in order to confirm the effects of the present invention.

FIG. 6 A diagram for illustrating a state of deformation due to bending of the measurement of a displacement conducted in order to confirm the effects of the present invention.

FIG. 7 A table showing the Curie points and the thermal expansion coefficients of Examples 1, 2, and 3 and a comparative example 1 employed in order to confirm the effects of the present invention.

FIG. 9 A table showing the results of the measurement of a displacement conducted in order to confirm the effects of the present invention.

FIG. 10 A table showing bending coefficients obtained from the measurement of a displacement conducted in order to confirm the effects of the present invention.

FIG. 11 A graph showing results of measurement of an oxidation mass increase conducted in order to confirm the effects of the present invention.

MODES FOR CARRYING OUT THE INVENTION

Embodiments of the present invention are hereinafter described with reference to the drawings.

First Embodiment

The structure of a high-temperature bimetal 1 according to a first embodiment of the present invention is now described with reference to FIG. 1.

Figure 1:
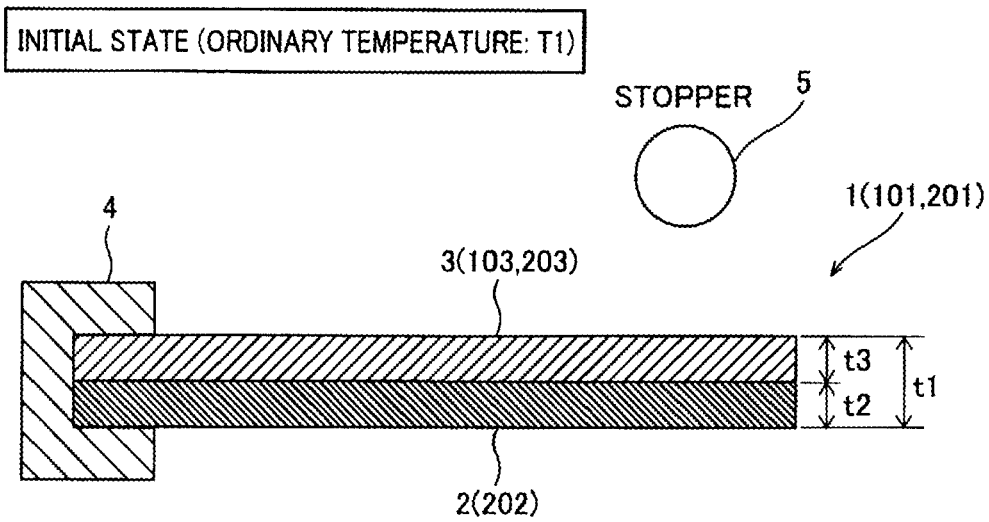
FIG. 1 A diagram showing a high-temperature bimetal in an initial state according to each of first to third embodiments of the present invention.

The high-temperature bimetal 1 according to the first embodiment of the present invention is constituted by a two-layered cladding material including a plate-like high thermal expansion layer 2 and a plate-like low thermal expansion layer 3 bonded to the high thermal expansion layer 2, as shown in FIG. 1. The high-temperature bimetal 1 has a thickness t1 of about 0.2 mm.

The high-temperature bimetal 1 is formed not to be deformed by bending at an ordinary temperature T1 (about 25° C.), which is an initial state. As an example of the mode of use of the high-temperature bimetal 1, in the first embodiment, a first end of the high-temperature bimetal 1 is fixed with a fixing portion 4 when the high-temperature bimetal 1 is employed in a prescribed device (not shown). Further, the prescribed device employing the high-temperature bimetal 1 is provided with a stopper 5 for inhibiting excessive deformation of the high-temperature bimetal 1 on the side closer to a second end of the high-temperature bimetal 1 and the low thermal expansion layer 3. This stopper 5 is arranged to come into contact with the high-temperature bimetal 1 when the high-temperature bimetal 1 is deformed by bending at a prescribed set temperature T2. The stopper 5 is an example of the "stopper member" in the present invention.

According to the first embodiment, a lower limit of an operating temperature range in which the high-temperature bimetal 1 can be employed is about −70° C., and an upper limit (highest acceptable temperature T3) of the operating temperature range is about 700° C. The upper limit of the operating temperature range of the high-temperature bimetal 1 may simply be at least about 500° C. and is preferably at least about 500° C. and not more than about 700° C.

The high thermal expansion layer 2 is made of a 18Cr-8Ni—Fe alloy (SUS304) containing about 18 mass % of Cr, about 8 mass % of Ni, Fe, and trace unavoidable impurities. Fe is a basic constituent of the SUS304 and occupies the balance other than Cr, Ni, and unavoidable impurities. The SUS304 of the high thermal expansion layer 2 is austenitic stainless steel and has a thermal expansion coefficient of about $17.3 \times 10^{-6}$/K.

According to the first embodiment, the low thermal expansion layer 3 is made of a 36Ni-6Nb—Fe alloy containing about 36 mass % of Ni, about 6 mass % of Nb, Fe, and trace unavoidable impurities. Fe is a basic constituent of the 36Ni-6Nb—Fe alloy and occupies the balance other than Ni, Nb, and unavoidable impurities. The 36Ni-6Nb—Fe alloy of the low thermal expansion layer 3 is a thermosensitive magnetic metal having a Curie point of about 200° C. Thus, the Curie point (about 200° C.) of the 36Ni-6Nb—Fe alloy of the low thermal expansion layer 3 is included in the operating temperature range of at least about −70° C. and not more than about 700° C. in which the high-temperature bimetal 1 can be employed. Thus, the high-temperature bimetal 1 according to the first embodiment is formed to be employed over both a high temperature range of not less than the Curie point and a low temperature range of less than the Curie point. The "Curie point" denotes a temperature at which the thermosensitive magnetic metal changes from a ferromagnetic material to a paramagnetic material when the temperature rises and a temperature at which the thermosensitive magnetic metal changes from a paramagnetic material to a ferromagnetic material when the temperature falls.

In the high-temperature bimetal 1, an operating temperature range (about 700° C.–about 200° C.=about 500° C.) of a high temperature range of at least the Curie point (about 200° C.) and not more than about 700° C. is larger than an operating temperature range (about 200° C.–(about −70° C.)=about 270° C.) of a low temperature range of at least about −70° C. and less than the Curie point (about 200° C.)

The 36Ni-6Nb—Fe alloy of the low thermal expansion layer 3 is formed to have a thermal expansion coefficient of about $4.1 \times 10^{-6}$/K in the low temperature range of less than the Curie point (about 200° C.) and a thermal expansion coefficient of about $15.8 \times 10^{-6}$/K in the high temperature range of not less than the Curie point. The 36Ni-6Nb—Fe alloy of the low thermal expansion layer 3 is formed such that the thermal expansion coefficient (about $4.1 \times 10^{-6}$/K) thereof in the low temperature range of less than the Curie point is smaller than the thermal expansion coefficient (about $15.8 \times 10^{-6}$/K) thereof in the high temperature range of not less than the Curie point. The thermal expansion coefficient (about $15.8 \times 10^{-6}$/K) of the low thermal expansion layer 3 in the high temperature range is about 3.9 times the thermal expansion coefficient (about $4.1 \times 10^{-6}$/K) of the low thermal expansion layer 3 in the low temperature range. The thermal expansion coefficient of the low thermal expansion layer 3 in the high temperature range is preferably at least about twice the thermal expansion coefficient of the low thermal expansion layer 3 in the low temperature range.

Thus, a difference (about $1.5 \times 10^{-6}$/K) between the thermal expansion coefficient (about $17.3 \times 10^{-6}$/K) of the high thermal expansion layer 2 in the high temperature range and the thermal expansion coefficient (about $15.8 \times 10^{-6}$/K) of the low thermal expansion layer 3 in the high temperature range is smaller than a difference (about $13.2 \times 10^{-6}$/K) between the thermal expansion coefficient (about $17.3 \times 10^{-6}$/K) of the high thermal expansion layer 2 in the low temperature range and the thermal expansion coefficient (about $4.1 \times 10^{-6}$/K) of the low thermal expansion layer 3 in the low temperature range.

The thermal expansion coefficients (about $4.1 \times 10^{-6}$/K and about $15.8 \times 10^{-6}$/K) of the 36Ni-6Nb—Fe alloy of the low thermal expansion layer 3 in the low temperature range and the high temperature range are smaller than the thermal expansion coefficient (about $17.3 \times 10^{-6}$/K) of the SUS304 of the high thermal expansion layer 2. Specifically, the thermal expansion coefficient (about $4.1 \times 10^{-6}$/K) of the 36Ni-6Nb—Fe alloy of the low thermal expansion layer 3 in the low temperature range of less than the Curie point (about 200° C.) is about 24% of the thermal expansion coefficient (about $17.3 \times 10^{-6}$/K) of the SUS304 of the high thermal expansion layer 2. Further, the thermal expansion coefficient (about $15.8 \times 10^{-6}$/K) of the 36Ni-6Nb—Fe alloy of the low thermal expansion layer 3 in the high temperature range of not less than the Curie point is about 91% of the thermal expansion coefficient (about $17.3 \times 10^{-6}$/K) of the SUS304 of the high thermal expansion layer 2. The thermal expansion coefficient of the low thermal expansion layer 3 in the low temperature range is preferably not more than about 50% of the thermal expansion coefficient of the high thermal expansion layer 2, and the thermal expansion coefficient of the low thermal expansion layer 3 in the high temperature range is preferably at least about 70% and less than about 100% of the thermal expansion coefficient of the high thermal expansion layer 2.

The high-temperature bimetal 1 has a bending coefficient K1 of about $6.7 \times 10^{-6}$/K in the low temperature range of less than the Curie point (about 200° C.) and a bending coefficient K2 of about $3.3 \times 10^{-6}$/K in the high temperature range of not less than the Curie point. The high-temperature bimetal 1 is formed such that the bending coefficient K2 (about $3.3 \times 10^{-6}$/K) is smaller than the bending coefficient K1 (about $6.7 \times 10^{-6}$/K).

As shown in FIG. 1, the thickness t2 of the SUS304 of the high thermal expansion layer 2 of the high-temperature bimetal 1 and the thickness t3 of the 36Ni-6Nb—Fe alloy of the low thermal expansion layer 3 of the high-temperature bimetal 1 satisfy a relation: t2:t3=about 47:about 53. In other words, the proportion of the thickness t3 of the 36Ni-6Nb—Fe alloy of the low thermal expansion layer 3 to the total thickness t1 of the high-temperature bimetal 1 is about 0.53, whereby the thickness t3 of the 36Ni-6Nb—Fe alloy of the low thermal expansion layer 3 is larger than the thickness t2 of the SUS304 of the high thermal expansion layer 2.

The high-temperature bimetal 1 is formed such that the mass (oxidation mass increase) of the high-temperature bimetal 1 increased by oxidation of the high-temperature bimetal 1 (the high thermal expansion layer 2 and the low thermal expansion layer 3) resulting from a rise in the temperature to an upper limit (about 700° C.) of operating temperatures in the high temperature range of not less than the Curie point (about 200° C.) is not more than about 1.5 mg per cubic centimeter. If the oxidation mass increase is more than about 1.5 mg (acceptable value) per cubic centimeter, an increase in the thickness of the high-temperature bimetal 1 due to the oxidation is more than about 2 μm and exceeds about 1% of the thickness (about 0.2 mm) of the high-temperature bimetal 1 before the oxidation. Thus, if the oxidation mass increase is more than about 1.5 mg per cubic centimeter, the property (bending coefficient K or the like) of the high-temperature bimetal 1 changes to such an extent that a practical problem is caused.

The deformation due to bending of the high-temperature bimetal 1 according to the first embodiment of the present invention is now described with reference to FIGS. 1 to 4.

Figure 2:
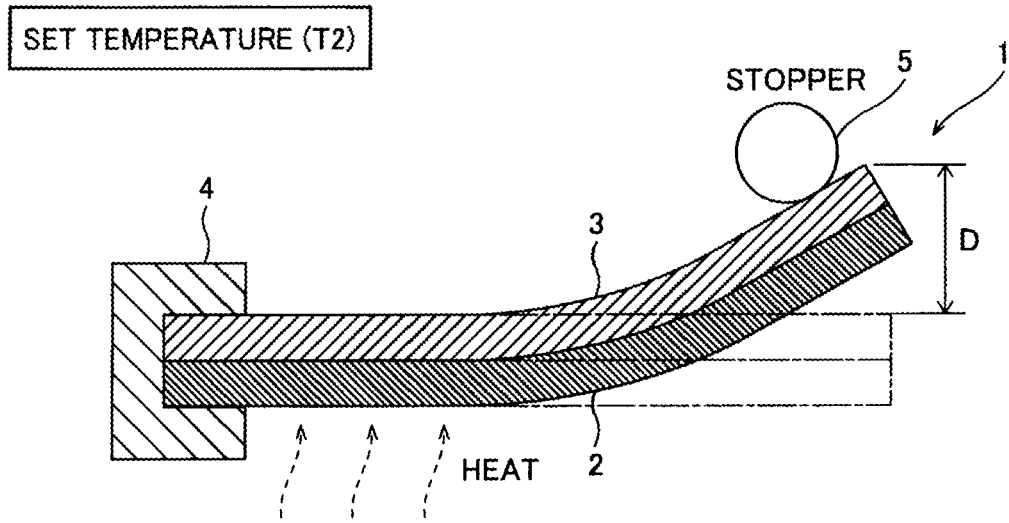
FIG. 2 A diagram showing the high-temperature bimetal in a state where the temperature has risen from the state shown in FIG. 1 to reach a set temperature.

As shown in FIG. 1, the high-temperature bimetal 1 is not deformed by bending in an initial state (ordinary temperature T1 (about 25° C.)). If the temperature rises from that state, the high-temperature bimetal 1 is deformed by bending to the side closer to the low thermal expansion layer 3 thereby causing a displacement D (see FIG. 2). When the temperature reaches the prescribed set temperature T2, the side of the high-temperature bimetal 1 closer to the low thermal expansion layer 3 comes into contact with the stopper 5 provided on the prescribed device employing the high-temperature bimetal 1, as shown in FIG. 2.

In the mode of use of the high-temperature bimetal 1 according to the first embodiment, the prescribed set temperature T2 is close to the Curie point (about 200° C.) of the low thermal expansion layer 3 of the high-temperature bimetal 1 and higher than the Curie point.

Figure 3:
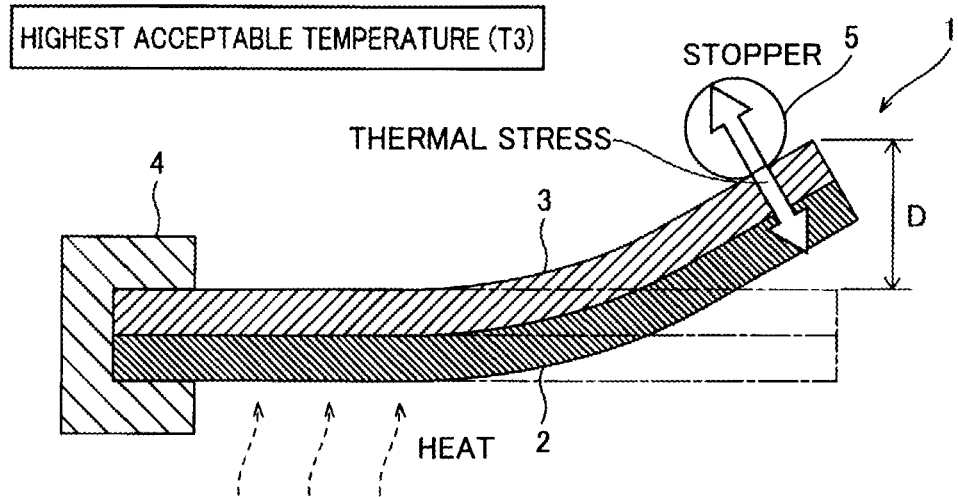
FIG. 3 A diagram showing the high-temperature bimetal in a state where the temperature has risen from the state shown in FIG. 2 to reach a highest acceptable temperature.

If the temperature further rises from a state where the side of the high-temperature bimetal 1 closer to the low thermal expansion layer 3 and the stopper 5 come into contact with each other, the high-temperature bimetal 1 is attempted to be deformed by bending to the side closer to the low thermal expansion layer 3 with the rise in the temperature while the stopper 5 restricts larger deformation than the deformation due to bending at the prescribed set temperature T2 during the rise in the temperature from the prescribed set temperature T2 to the highest acceptable temperature T3 (about 700° C.), as shown in FIG. 3. Therefore, force is applied from the high-temperature bimetal 1 to the stopper 5 while reaction force is applied from the stopper 5 to the high-temperature bimetal 1. This reaction force changes to thermal stress and is accumulated in the high-temperature bimetal 1.

According to the first embodiment, the bending coefficient K2 (about $3.3 \times 10^{-6}$/K) of the high-temperature bimetal 1 in the high temperature range of not less than the Curie point (about 200° C.) is smaller than the bending coefficient K1 (about $6.7 \times 10^{-6}$/K) of the high-temperature bimetal 1 in the low temperature range of less than the Curie point, and hence the deformation due to bending in the high temperature range of not less than the Curie point is smaller than the deformation due to bending in the low temperature range of less than the Curie point. Thus, the force applied from the high-temperature bimetal 1 to the stopper 5 is small compared with force applied in a case where the high-temperature bimetal has only the bending coefficient K1 in the low temperature range of less than the Curie point (a case where the high-temperature bimetal has no Curie point and the bending coefficient K thereof is constant).

Figure 4:
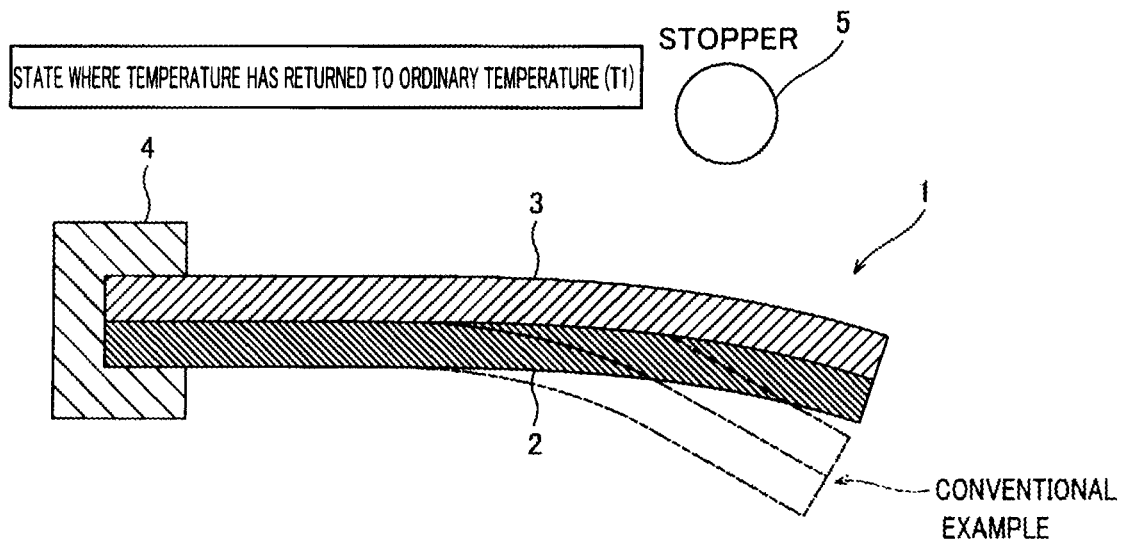
FIG. 4 A diagram showing the high-temperature bimetal in a state where the temperature has fallen from the state shown in FIG. 3 to return to an ordinary temperature.

Thus, if the temperature falls from the highest acceptable temperature T3 (about 700° C.) to return (decrease) to the ordinary temperature T1 (about 25° C.), the deformation due to bending resulting from the thermal stress accumulated in the high-temperature bimetal 1 is small compared with deformation due to bending of a high-temperature bimetal according to a conventional example of the present invention having no Curie point, the bending coefficient K of which is constant (a conventional example indicated by a two-dot chain line in FIG. 4), as shown in FIG. 4. In other words, a shift of the high-temperature bimetal 1 according to the first embodiment from an original position is small compared with a shift of the high-temperature bimetal according to the conventional example of the present invention from the original position.

A method for manufacturing the high-temperature bimetal 1 according to the first embodiment of the present invention is now described with reference to FIG. 1.

Plate-like SUS304 having a thickness of about 1.5 mm and a plate-like 36Ni-6Nb—Fe alloy having a thickness of about 1.7 mm are cold-pressure-bonded to each other at a rolling reduction of about 60.6% thereby forming a bimetal made of a two-layered cladding material having a thickness of about 1.3 mm. Then, diffusion annealing is performed under a hydrogen atmosphere at about 1050° C. for about three minutes. Thus, the bond strength between a high thermal expansion layer and a low thermal expansion layer of the bimetal can be improved. Thereafter, the bimetal having a thickness of about 1.3 mm is cold-rolled to have a thickness t1 (see FIG. 1) of about 0.2 mm. Thus, the high-temperature bimetal 1 (see FIG. 1) according to the first embodiment is formed.

Also in the aforementioned pressure-bonding and rolling, the ratio between the thickness of the plate-like SUS304 and the thickness of the plate-like 36Ni-6Nb—Fe alloy remains unchanged. Thus, the thickness t2 (see FIG. 1) of the high thermal expansion layer 2 made of the SUS304 and the thickness t3 (see FIG. 1) of the low thermal expansion layer 3 made of the 36Ni-6Nb—Fe alloy satisfy a relation: t2:t3=about 1.5:about 1.7=about 47:about 53.

According to the first embodiment, as hereinabove described, the low thermal expansion layer 3 is made of the 36Ni-6Nb—Fe alloy having the Curie point (about 200° C.), and the high-temperature bimetal 1 is employed over both the high temperature range (at least about 200° C. and not more than about 700° C.) not less than the Curie point and the low temperature range (at least about −70° C. and less than about 200° C.) less than the Curie point. Thus, the thermal expansion coefficient (about $15.8 \times 10^{-6}$/K) of the 36Ni-6Nb—Fe alloy in the high temperature range of not less than the Curie point is larger than the thermal expansion coefficient (about $4:1 \times 10^{-6}$/K) of the 36Ni-6Nb—Fe alloy in the low temperature range of less than the Curie point, and hence the difference (about $1.5 \times 10^{-6}$/K) between the thermal expansion coefficient (about $17.3 \times 10^{-6}$/K) of the high thermal expansion layer 2 in the high temperature range and the thermal expansion coefficient of the low thermal expansion layer 3 in the high temperature range can be rendered smaller than the difference (about $13.2 \times 10^{-6}$/K) between the thermal expansion coefficient of the high thermal expansion layer 2 in the low temperature range and the thermal expansion coefficient of the low thermal expansion layer 3 in the low temperature range. Thus, the deformation due to bending of the high-temperature bimetal 1 according to the first embodiment in the high temperature range is small compared with the deformation due to bending of the high-temperature bimetal 1 according to the first embodiment in the low temperature range, and hence the displacement D of the deformation due to bending of the high-temperature bimetal 1 in the high temperature range of not less than the Curie point can be rendered smaller than the displacement D of the deformation due to bending of the high-temperature bimetal 1 in the low temperature range of less than the Curie point. Therefore, even if the stopper 5 restricts the deformation of the high-temperature bimetal 1 in the high temperature range (range from T2 to T3) including a temperature range higher than the vicinity of the Curie point, accumulation of thermal stress in the high-temperature bimetal 1 can be inhibited. Thus, thermal stress can be hardly accumulated inside. Consequently, the high-temperature bimetal 1 capable of being inhibited from considerably shifting from an original position when the temperature has fallen to the ordinary temperature can be provided. Further, the useful high-temperature bimetal 1 can be obtained when it is desired to render thermal expansion small in a temperature range of at least about 200° C. while the high-temperature bimetal 1 capable of being employed until about 700° C. and only slightly shifting from the original position when the temperature has fallen can be easily obtained.

According to the first embodiment, as hereinabove described, the high-temperature bimetal 1 is formed such that the bending coefficient K2 (about $3.3 \times 10^{-6}$/K) of the high-temperature bimetal 1 in the high temperature range of not less than the Curie point (about 200° C.) is smaller than the bending coefficient K1 (about $6.7 \times 10^{-6}$/K) of the high-temperature bimetal 1 in the low temperature range of less than the Curie point, whereby the deformation due to bending of the high-temperature bimetal 1 in the high temperature range of not less than the Curie point is smaller than the deformation due to bending of the high-temperature bimetal 1 in the low temperature range of less than the Curie point. Thus, accumulation of thermal stress in the high-temperature bimetal 1 can be easily inhibited in the high temperature range of not less than the Curie point.

According to the first embodiment, as hereinabove described, the operating temperature range (about 500° C.) of the high temperature range of at least the Curie point (about 200° C.) and not more than about 700° C. is larger than the operating temperature range (about 270° C.) of the low temperature range of at least about −70° C. and less than the Curie point, whereby a temperature range of the high temperature range of not less than the Curie point, in which the displacement D of the high-temperature bimetal 1 is small, can be rendered larger than a temperature range of the low temperature range of less than the Curie point, in which the displacement D of the high-temperature bimetal 1 is large. Consequently, accumulation of thermal stress in the high-temperature bimetal 1 can be further inhibited in the high temperature range of not less than the Curie point.

According to the first embodiment, as hereinabove described, the low thermal expansion layer 3 is made of the 36Ni-6Nb—Fe alloy containing about 36 mass % of Ni, about 6 mass % of Nb, Fe, and trace unavoidable impurities, whereby the high-temperature bimetal 1 including the thermosensitive magnetic metal having a Curie point of about 200° C. can be obtained. Further, the high-temperature bimetal 1 being oxidation-resistant enough not to cause a problem even if the temperature rises to the upper limit (about 700° C.) of operating temperatures of the high-temperature bimetal 1 and including the thermosensitive magnetic metal capable of inhibiting a reduction in workability can be obtained.

According to the first embodiment, as hereinabove described, the thickness t3 of the 36Ni-6Nb—Fe alloy of the low thermal expansion layer 3 is larger than the thickness t2 of the SUS304 of the high thermal expansion layer 2, whereby the high-temperature bimetal 1 having the large bending coefficient K1 in the low temperature range of less than the Curie point (about 200° C.) can be easily obtained.

According to the first embodiment, as hereinabove described, the high-temperature bimetal 1 is formed such that the mass (oxidation mass increase) of the high-temperature bimetal 1 increased by the oxidation of the high-temperature bimetal 1 (the high thermal expansion layer 2 and the low thermal expansion layer 3) resulting from the rise in the temperature to the upper limit (about 700° C.) of the operating temperatures in the high temperature range of not less than the Curie point (about 200° C.) is not more than about 1.5 mg per cubic centimeter. Thus, the thickness of the high-temperature bimetal 1 increased by the oxidation can be rendered not more than about 1% of the total thickness t1 (=t2+t3) of the high-temperature bimetal 1 before the oxidation of the high-temperature bimetal 1. Thus, the property (bending coefficients K1 and K2 or the like) of the high-temperature bimetal 1 can be inhibited from changing to such an extent that a practical problem is caused by an increase in the total thickness t1 of the high-temperature bimetal 1 by more than about 1% due to the oxidation.

According to the first embodiment, as hereinabove described, the thermal expansion coefficient (about 15.8× $10^{-6}$/K) of the 36Ni-6Nb—Fe alloy of the low thermal expansion layer 3 in the high temperature range of not less than the Curie point (about 200° C.) is about 91% of the thermal expansion coefficient (about 17.3×$10^{-6}$/K) of the SUS304 of the high thermal expansion layer 2. Thus, the high-temperature bimetal 1 can be inhibited from being deformed to the side closer to the high thermal expansion layer 2 in the high temperature range, and the deformation due to bending of the high-temperature bimetal 1 in the high temperature range can be inhibited from increase due to a significant difference between the thermal expansion coefficient of the high thermal expansion layer 2 and the thermal expansion coefficient of the low thermal expansion layer 3 in the high temperature range.

According to the first embodiment, as hereinabove described, the thermal expansion coefficient (about 15.8× $10^{-6}$/K) of the low thermal expansion layer 3 in the high temperature range is about 3.9 times the thermal expansion coefficient (about 4.1×$10^{-6}$/K) of the low thermal expansion layer 3 in the low temperature range of less than the Curie point (about 200° C.), whereby the deformation due to bending of the high-temperature bimetal 1 in the low temperature range of less than the Curie point (about 200° C.) can be further inhibited from decrease.

According to the first embodiment, as hereinabove described, the thermal expansion coefficient (about 4.1×$10^{-6}$/K) of the 36Ni-6Nb—Fe alloy of the low thermal expansion layer 3 in the low temperature range is about 24% of the thermal expansion coefficient (about 17.3×$10^{-6}$/K) of the SUS304 of the high thermal expansion layer 2. Thus, the difference between the thermal expansion coefficient of the high thermal expansion layer 2 in the low temperature range and the thermal expansion coefficient of the low thermal expansion layer 3 in the low temperature range can be rendered large, and hence the high-temperature bimetal 1 in the low temperature range can be more highly deformed by bending.

According to the first embodiment, as hereinabove described, the set temperature T2 at which the side of the high-temperature bimetal 1 closer to the low thermal expansion layer 3 comes into contact with the stopper 5 provided on the employed prescribed device is close to the Curie point (about 200° C.) of the low thermal expansion layer 3 of the high-temperature bimetal 1 and higher than the Curie point. Thus, the low thermal expansion layer 3 comes into contact with the stopper member 5 in the high temperature range of not less than the Curie point in which accumulation of thermal stress in the high-temperature bimetal 1 is inhibited, and hence thermal stress resulting from contact with the stopper member 5 can be hardly accumulated in the high-temperature bimetal 1. Further, the low thermal expansion layer 3 comes into contact with the stopper member 5 at a temperature close to the Curie point, and hence a state where the thermal stress resulting from contact with the stopper member 5 is hardly accumulated in the high-temperature bimetal 1 is available over a wide temperature range.

Second Embodiment

A second embodiment of the present invention is now described with reference to FIG. 1. In relation to a high-temperature bimetal 101 according to this second embodiment, a case where a low thermal expansion layer 103 is made of a 40Ni-10Cr—Fe alloy dissimilarly to the aforementioned first embodiment is described.

In the high-temperature bimetal 101 according to the second embodiment of the present invention, the low thermal expansion layer 103 is made of the 40Ni-10Cr—Fe alloy containing about 40 mass % of Ni, about 10 mass % of Cr, Fe, and trace unavoidable impurities. Fe is a basic constituent of the 40Ni-10Cr—Fe alloy and occupies the balance other than Ni, Cr, and unavoidable impurities. The 40Ni-10Cr—Fe alloy of the low thermal expansion layer 103 has a Curie point of about 200° C. Thus, the Curie point (about 200° C.) of a thermosensitive magnetic metal of the low thermal expansion layer 103 is included in an operating temperature range of at least about −70° C. and not more than about 700° C. in which the high-temperature bimetal 101 can be employed. Further, in the high-temperature bimetal 101, an operating temperature range (about 500° C.) of a high temperature range of at least the Curie point (about 200° C.) and not more than about 700° C. is larger than an operating temperature range (about 270° C.) of a low temperature range of at least about −70° C. and less than about 200° C.

The 40Ni-10Cr—Fe alloy of the low thermal expansion layer 103 is'formed to have a thermal expansion coefficient of about 8.2×$10^{-6}$/K in the low temperature range of less than the Curie point (about 200° C.) and a thermal expansion coefficient of about 16.8×$10^{-6}$/K in the high temperature range of not less than the Curie point. The 40Ni-10Cr—Fe alloy of the low thermal expansion layer 103 is formed such that the thermal expansion coefficient (about 8.2×$10^{-6}$/K) thereof in the low temperature range of less than the Curie point is smaller than the thermal expansion coefficient (about 16.8×$10^{-6}$/K) thereof in the high temperature range of not less than the Curie point. The thermal expansion coefficient (about 16.8×$10^{-6}$/K) of the low thermal expansion layer 103 in the high temperature range is about twice the thermal expansion coefficient (about 8.2×$10^{-6}$/K) of the low thermal expansion layer 103 in the low temperature range.

Thus, a difference (about 0.5×$10^{-6}$/K) between the thermal expansion coefficient (about 17.3×$10^{-6}$/K) of SUS304 of a high thermal expansion layer 2 in the high temperature range and the thermal expansion coefficient (about 16.8× $10^{-6}$/K) of the low thermal expansion layer 103 in the high temperature range is smaller than a difference (about 9.1× $10^{-6}$/K) between the thermal expansion coefficient (about 17.3×$10^{-6}$/K) of the SUS304 of the high thermal expansion layer 2 in the low temperature range and the thermal expansion coefficient (about 8.2×$10^{-6}$/K) of the low thermal expansion layer 103 in the low temperature range.

The thermal expansion coefficients (about 8.2×$10^{-6}$/K and about 16.8×$10^{-6}$/K) of the 40Ni-10Cr—Fe alloy of the low thermal expansion layer 103 at less than the Curie point (about 200° C.) and not less than the Curie point are smaller than the thermal expansion coefficient (about 17.3×$10^{-6}$/K) of the SUS304 of the high thermal expansion layer 2. Specifically, the thermal expansion coefficient (about 8.2× $10^{-6}$/K) of the 40Ni-10Cr—Fe alloy of the low thermal expansion layer 103 in the low temperature range of less than the Curie point (about 200° C.) is about 47% of the thermal expansion coefficient (about 17.3×$10^{-6}$/K) of the SUS304 of the high thermal expansion layer 2. Further, the thermal expansion coefficient (about 16.8×$10^{-6}$/K) of the 40Ni-10Cr—Fe alloy of the low thermal expansion layer 103 in the high temperature range of not less than the Curie point is about 97% of the thermal expansion coefficient (about 17.3×$10^{-6}$/K) of the SUS304 of the high thermal expansion layer 2. The thermal expansion coefficient of the low thermal expansion layer 103 in the low temperature range is preferably not more than about 50% of the thermal expansion coefficient of the high thermal expansion layer 2, and the thermal expansion coefficient of the low thermal expansion layer 103 in the high temperature range is preferably at least about 70% and less than about 100% of the thermal expansion coefficient of the high thermal expansion layer 2.

The high-temperature bimetal 101 has a bending coefficient K1 of about $2.3\times10^{-6}$/K in the low temperature range of less than the Curie point (about 200° C.) and a bending coefficient K2 of about $1.1\times10^{-6}$/K in the high temperature range of not less than the Curie point. The high-temperature bimetal 101 is formed such that the bending coefficient K2 (about $1.1\times10^{-6}$/K) is smaller than the bending coefficient K1 (about $2.3\times10^{-6}$/K).

As shown in FIG. 1, the thickness t2 of the SUS304 of the high thermal expansion layer 2 of the high-temperature bimetal 101 and the thickness t3 of the 40Ni-10Cr—Fe alloy of the low thermal expansion layer 103 of the high-temperature bimetal 101 satisfy a relation: t2:t3=about 45:about 55. In other words, the thickness t3 of the 40Ni-10Cr—Fe alloy of the low thermal expansion layer 103 is larger than the thickness t2 of the SUS304 of the high thermal expansion layer 2. The structure and deformation due to bending of the high-temperature bimetal according to the second embodiment are similar to those of the high-temperature bimetal according to the aforementioned first embodiment.

A method for manufacturing the high-temperature bimetal 101 according to the second embodiment of the present invention is now described with reference to FIG. 1.

Plate-like SUS304 having a thickness of about 1.5 mm and a plate-like 40Ni-10Cr—Fe alloy having a thickness of about 1.8 mm are cold-pressure-bonded to each other at a rolling reduction of about 60.6% thereby forming a bimetal made of a two-layered cladding material having a thickness of about 1.3 mm. Then, diffusion annealing is performed under a hydrogen atmosphere at about 1050° C. for about three minutes. Thus, the bond strength between a high thermal expansion layer and a low thermal expansion layer of the bimetal can be improved. Thereafter, the bimetal having a thickness of about 1.3 mm is cold-rolled to have a thickness t1 (see FIG. 1) of about 0.2 mm. Thus, the high-temperature bimetal 101 (see FIG. 1) according to the second embodiment is formed.

Also in the aforementioned pressure-bonding and rolling, the ratio between the thickness of the plate-like SUS304 and the thickness of the plate-like 40Ni-10Cr—Fe alloy remains unchanged. Thus, the thickness t2 (see FIG. 1) of the high thermal expansion layer 2 made of the SUS304 and the thickness t3 (see FIG. 1) of the low thermal expansion layer 103 made of the 40Ni-10Cr—Fe alloy satisfy a relation: t2:t3=about 1.5:about 1.8=about 45:about 55. In other words, the proportion of the thickness t3 of the 40Ni-10Cr—Fe alloy of the low thermal expansion layer 103 to the thickness t1 of the high-temperature bimetal 101 is about 0.55, whereby the thickness t3 of the 40Ni-10Cr—Fe alloy of the low thermal expansion layer 103 is larger than the thickness t2 of the SUS304 of the high thermal expansion layer 2.

According to the second embodiment, as hereinabove described, the low thermal expansion layer 103 is made of the 40Ni-10Cr—Fe alloy containing about 40 mass % of Ni, about 10 mass % of Cr, Fe, and trace unavoidable impurities, whereby the high-temperature bimetal 101 including the thermosensitive magnetic metal having a Curie point of about 200° C. can be obtained. Further, the high-temperature bimetal 101 being oxidation-resistant enough not to cause a problem even if the temperature rises to the upper limit (about 700° C.) of operating temperatures of the high-temperature bimetal 101 and including the thermosensitive magnetic metal capable of inhibiting an excessive increase in a thermal expansion coefficient can be obtained.

According to the second embodiment, as hereinabove described, the thermal expansion coefficient (about $16.8\times10^{-6}$/K) of the 40Ni-10Cr—Fe alloy of the low thermal expansion layer 103 in the high temperature range of not less than the Curie point (about 200° C.) is about 97% of the thermal expansion coefficient (about $17.3\times10^{-6}$/K) of the SUS304 of the high thermal expansion layer 2. Thus, the high-temperature bimetal 101 can be inhibited from being deformed to the side closer to the high thermal expansion layer 2 in the high temperature range, and the deformation due to bending of the high-temperature bimetal 101 in the high temperature range can be inhibited from increase due to a significant difference between the thermal expansion coefficient of the high thermal expansion layer 2 and the thermal expansion coefficient of the low thermal expansion layer 103 in the high temperature range.

According to the second embodiment, as hereinabove described, the thermal expansion coefficient (about $16.8\times10^{-6}$/K) of the low thermal expansion layer 103 in the high temperature range is about twice the thermal expansion coefficient (about $8.2\times10^{-6}$/K) of the low thermal expansion layer 103 in the low temperature range of less than the Curie point (about 200° C.), whereby the deformation due to bending of the high-temperature bimetal 101 in the low temperature range of less than the Curie point (about 200° C.) can be further inhibited from decrease.

According to the second embodiment, as hereinabove described, the thermal expansion coefficient (about $8.2\times10^{-6}$/K) of the low thermal expansion layer 103 in the low temperature range is about 47% of the thermal expansion coefficient (about $17.3\times10^{-6}$/K) of the high thermal expansion layer 2. Thus, the difference between the thermal expansion coefficient of the high thermal expansion layer 2 in the low temperature range and the thermal expansion coefficient of the low thermal expansion layer 103 in the low temperature range can be rendered large, and hence the high-temperature bimetal 101 in the low temperature range can be more highly deformed by bending. The remaining effects of the high-temperature bimetal according to the second embodiment are similar to those of the high-temperature bimetal according to the aforementioned first embodiment.

Third Embodiment

A third embodiment of the present invention is now described with reference to FIG. 1. In relation to a high-temperature bimetal 201 according to this third embodiment, a case where a high thermal expansion layer 202 is made of a 12Cr-18Ni—Fe alloy while a low thermal expansion layer 203 is made of a 36Ni-2Nb—Fe alloy dissimilarly to the aforementioned first embodiment is described.

In the high-temperature bimetal 201 according to the third embodiment of the present invention, the high thermal expansion layer 202 is made of a 12Cr-18Ni—Fe alloy containing about 12 mass % of Cr, about 18 mass % of Ni, Fe, and trace unavoidable impurities. Fe is a basic constituent of the 12Cr-18Ni—Fe alloy and occupies the balance other than Ni, Cr, and unavoidable impurities. The 12Cr-18Ni—Fe alloy of the high thermal expansion layer 202 is austenitic stainless steel and has a thermal expansion coefficient of about $19.0\times10^{-6}$/K.

According to the third embodiment, the low thermal expansion layer 203 is made of the 36Ni-2Nb—Fe alloy containing about 36 mass % of Ni, about 2 mass % of Nb, Fe, and trace unavoidable impurities. Fe is a basic constituent of the 36Ni-2Nb—Fe alloy and occupies the balance other than Ni, Nb, and unavoidable impurities. The 36Ni-2Nb—Fe alloy of the low thermal expansion layer 203 has a Curie point of about 170° C. Thus, the Curie point (about 170° C.) of a thermosensitive magnetic metal of the low thermal expansion layer 203 is included in an operating temperature range of at least about −70° C. and not more than about 700° C. in which the high-temperature bimetal 201 can be employed. Further, in the high-temperature bimetal 201, an operating temperature range (about 530° C.) of a high temperature range of at least the Curie point (about 170° C.) and not more than about 700° C. is larger than an operating temperature range (about 200° C.) of a low temperature range of at least about −70° C. and less than about 170° C.

The 36Ni-2Nb—Fe alloy of the low thermal expansion layer 203 is formed to have a thermal expansion coefficient of about $3.0 \times 10^{-6}$/K in the low temperature range of less than the Curie point (about 170° C.) and a thermal expansion coefficient of about $15.7 \times 10^{-6}$/K in the high temperature range of not less than the Curie point. The 36Ni-2Nb—Fe alloy of the low thermal expansion layer 203 is formed such that the thermal expansion coefficient (about $3.0 \times 10^{-6}$/K) thereof in the low temperature range of less than the Curie point is smaller than the thermal expansion coefficient (about $15.7 \times 10^{-6}$/K) thereof in the high temperature range of not less than the Curie point. The thermal expansion coefficient (about $15.7 \times 10^{-6}$/K) of the low thermal expansion layer 203 in the high temperature range is about 5.2 times the thermal expansion coefficient (about $3.0 \times 10^{-6}$/K) of the low thermal expansion layer 203 in the low temperature range.

Thus, a difference (about $3.3 \times 10^{-6}$/K) between the thermal expansion coefficient (about $19.0 \times 10^{-6}$/K) of the high thermal expansion layer 202 in the high temperature range and the thermal expansion coefficient (about $15.7 \times 10^{-6}$/K) of the low thermal expansion layer 203 in the high temperature range is smaller than a difference (about $16.0 \times 10^{-6}$/K) between the thermal expansion coefficient (about $19.0 \times 10^{-6}$/K) of the high thermal expansion layer 202 in the low temperature range and the thermal expansion coefficient (about $3.0 \times 10^{-6}$/K) of the low thermal expansion layer 203 in the low temperature range.

The thermal expansion coefficients (about $3.0 \times 10^{-6}$/K and about $15.7 \times 10^{-6}$/K) of the 36Ni-2Nb—Fe alloy of the low thermal expansion layer 203 at less than the Curie point (about 170° C.) and not less than the Curie point are smaller than the thermal expansion coefficient (about $19.0 \times 10^{-6}$/K) of the 12Cr-18Ni—Fe alloy of the high thermal expansion layer 202. Specifically, the thermal expansion coefficient (about $3.0 \times 10^{-6}$/K) of the 36Ni-2Nb—Fe alloy of the low thermal expansion layer 203 in the low temperature range of less than the Curie point (about 170° C.) is about 16% of the thermal expansion coefficient (about $19.0 \times 10^{-6}$/K) of the 12Cr-18Ni—Fe alloy of the high thermal expansion layer 202. Further, the thermal expansion coefficient (about $15.7 \times 10^{-6}$/K) of the 36Ni-2Nb—Fe alloy of the low thermal expansion layer 203 in the high temperature range of not less than the Curie point is about 83% of the thermal expansion coefficient (about $19.0 \times 10^{-6}$/K) of the 12Cr-18Ni—Fe alloy of the high thermal expansion layer 202.

The high-temperature bimetal 201 has a bending coefficient K1 of about $11.9 \times 10^{-6}$/K in the low temperature range of less than the Curie point (about 170° C.) and a bending coefficient K2 of about $6.5 \times 10^{-6}$/K in the high temperature range of not less than the Curie point. The high-temperature bimetal 201 is formed such that the bending coefficient K2 (about $6.5 \times 10^{-6}$/K) is smaller than the bending coefficient K1 (about $11.9 \times 10^{-6}$/K). The structure and deformation due to bending of the high-temperature bimetal according to the third embodiment are similar to those of the high-temperature bimetal according to the aforementioned first embodiment, and a method for manufacturing the high-temperature bimetal according to the third embodiment is similar to the method for manufacturing the high-temperature bimetal according to the aforementioned first embodiment.

According to the third embodiment, as hereinabove described, the low thermal expansion layer 203 is made of the 36Ni-2Nb—Fe alloy containing about 36 mass % of Ni, about 2 mass % of Nb, Fe, and trace unavoidable impurities, whereby the high-temperature bimetal 201 including the thermosensitive magnetic metal having a Curie point of about 170° C. can be obtained. Further, the high-temperature bimetal 201 being oxidation-resistant enough not to cause a problem even if the temperature rises to the upper limit (about 700° C.) of operating temperatures of the high-temperature bimetal 201 and including the thermosensitive magnetic metal capable of inhibiting a reduction in workability can be obtained.

According to the third embodiment, as hereinabove described, the thermal expansion coefficient (about $15.7 \times 10^{-6}$/K) of the 36Ni-2Nb—Fe alloy of the low thermal expansion layer 203 in the high temperature range of not less than the Curie point (about 170° C.) is about 83% of the thermal expansion coefficient (about $19.0 \times 10^{-6}$/K) of the 12Cr-18Ni—Fe alloy of the high thermal expansion layer 202. Thus, the high-temperature bimetal 201 can be inhibited from being deformed to the side closer to the high thermal expansion layer 202 in the high temperature range, and the deformation due to bending of the high-temperature bimetal 201 in the high temperature range can be inhibited from increase due to a significant difference between the thermal expansion coefficient of the high thermal expansion layer 202 and the thermal expansion coefficient of the low thermal expansion layer 203 in the high temperature range.

According to the third embodiment, as hereinabove described, the thermal expansion coefficient (about $15.7 \times 10^{-6}$/K) of the low thermal expansion layer 203 in the high temperature range is about 5.2 times the thermal expansion coefficient (about $3.0 \times 10^{-6}$/K) of the low thermal expansion layer 203 in the low temperature range of less than the Curie point (about 170° C.), whereby the deformation due to bending of the high-temperature bimetal 201 in the low temperature range of less than the Curie point (about 170° C.) can be further inhibited from decrease.

According to the third embodiment, as hereinabove described, the thermal expansion coefficient (about $3.0 \times 10^{-6}$/K) of the low thermal expansion layer 203 in the low temperature range is about 16% of the thermal expansion coefficient (about $19.0 \times 10^{-6}$/K) of the high thermal expansion layer 202. Thus, the difference between the thermal expansion coefficient of the high thermal expansion layer 202 in the low temperature range and the thermal expansion coefficient of the low thermal expansion layer 203 in the low temperature range can be rendered large, and hence the high-temperature bimetal 201 in the low temperature range can be more highly deformed by bending. The remaining effects of the high-temperature bimetal according to the third embodiment are similar to those of the high-temperature bimetal according to the aforementioned first embodiment.

EXAMPLE

Measurement of a displacement and measurement of an oxidation mass increase conducted in order to confirm the effects of the high-temperature bimetals 1, 101, and 201 according to the aforementioned first to third embodiments are now described with reference to FIGS. 1 and 5 to 10.

In the measurement of a displacement and the measurement of an oxidation mass increase hereinafter described, a high-temperature bimetal prepared by the method for manufacturing the high-temperature bimetal 1 according to the aforementioned first embodiment was employed as an Example 1 corresponding to the high-temperature bimetal 1 (see FIG. 1) according to the aforementioned first embodiment. Specifically, the high-temperature bimetal (SUS304/36Ni-6Nb—Fe alloy) constituted by a high terminal expansion layer made of SUS304 and a low thermal expansion layer made of a 36Ni-6Nb—Fe alloy was employed as the Example 1. The thickness t1 (see FIG. 5) of the high-temperature bimetal according to the Example 1 is 0.2 mm, and the thickness t2 (see FIG. 5) of the SUS304 of the high thermal expansion layer and the thickness t3 (see FIG. 5) of the 36Ni-6Nb—Fe alloy of the low thermal expansion layer satisfy a relation: t2:t3=47:53 (=0.094 mm:0.106 mm).

A high-temperature bimetal prepared by the method for manufacturing the high-temperature bimetal 101 according to the aforementioned second embodiment was employed as an Example 2 corresponding to the high-temperature bimetal 101 (see FIG. 1) according to the aforementioned second embodiment. Specifically, the high-temperature bimetal (SUS304/40Ni-10Cr—Fe alloy) constituted by a high terminal expansion layer made of SUS304 and a low thermal expansion layer made of a 40Ni-10Cr—Fe alloy was employed as the Example 2. The thickness t1 (see FIG. 5) of the high-temperature bimetal according to the Example 2 is 0.2 mm, and the thickness t2 (see FIG. 5) of the SUS304 of the high thermal expansion layer and the thickness t3 (see FIG. 5) of the 40Ni-10Cr—Fe alloy of the low thermal expansion layer satisfy a relation: t2:t3=45:55 (=0.09 mm:0.11 mm).

A high-temperature bimetal prepared by the method (similar to the method for manufacturing the high-temperature bimetal 1 according to the first embodiment) for manufacturing the high-temperature bimetal 201 according to the aforementioned third embodiment was employed as an Example 3 corresponding to the high-temperature bimetal 201 (see FIG. 1) according to the aforementioned third embodiment. Specifically, the high-temperature bimetal (12Cr-18Ni—Fe alloy/36Ni-2Nb—Fe alloy) constituted by a high terminal expansion layer made of a 12Cr-18Ni—Fe alloy and a low thermal expansion layer made of a 36Ni-2Nb—Fe alloy was employed as the Example 3.

(Measurement of Displacement)

The measurement of a displacement is first described. In this measurement of a displacement, a high-temperature bimetal 301 having a thickness t1 of 0.2 mm, a length L of 15 mm, and a width of 2 mm (not shown) was employed to perform the measurement, as shown in FIG. 5. The high-temperature bimetal 301 was formed not to be deformed by bending in an initial state (ordinary temperature T1 (25° C.)).

In the measurement of a displacement, a first end of the high-temperature bimetal 301 in a length direction was fixed with a fixing portion 304. Then, the temperature rises to maximum of 700° C. from the initial state, whereby the high-temperature bimetal 301 was deformed by bending to the side closer to a low thermal expansion layer 303, as shown in FIG. 6. At this time, the displacement D (mm) of the high-temperature bimetal 301 resulting from deformation due to bending with changes in temperature T (° C.) was measured. Further, the bending coefficient K of the high-temperature bimetal 301 was calculated on the basis of the measured displacement D and the following expression (1):

$$K=(t1)\Delta D/L^2 \Delta T \quad (1)$$

Here, t1 represents the thickness (see FIG. 5) of the high-temperature bimetal 301 and is equal to 0.2 mm. L represents the width (see FIG. 5) of the high-temperature bimetal 301 and is equal to 15 mm. ΔD represents a difference between a first displacement at an arbitrary first temperature and a second displacement at an arbitrary second temperature different from the first temperature. ΔT represents a difference between the first temperature and the second temperature.

In the measurement of a displacement, each of the aforementioned Example 1 (SUS304/36Ni-6Nb—Fe alloy), Example 2 (SUS304/40Ni-10Cr—Fe alloy), and Example 3 (12Cr-18Ni—Fe alloy/36Ni-2Nb—Fe alloy) was employed as the high-temperature bimetal 301. On the other hand, the high-temperature bimetal 301 (SUS304/18Cr—Fe alloy) having a high thermal expansion layer 302 made of SUS304 and the low thermal expansion layer 303 made of a 18Cr—Fe alloy containing 18 mass % of Cr, Fe, and trace unavoidable impurities was employed as a comparative example 1 to be compared with the Example 1. The 18Cr—Fe alloy of the low thermal expansion layer 303 of the high-temperature bimetal 301 according to this comparative example 1 has no Curie point. The thickness t1 of the high-temperature bimetal 301 according to the comparative example 1 is 0.2 mm, and the thickness t2 (see FIG. 5) of the SUS304 of the high thermal expansion layer 302 of the high-temperature bimetal 301 according to the comparative example 1 and the thickness t3 (see FIG. 5) of the 18Cr—Fe alloy of the low thermal expansion layer 303 of the high-temperature bimetal 301 according to the comparative example 1 satisfy a relation: t2:t3=50:50 (=0.1 mm:0.1 mm). A high-temperature bimetal having a bending coefficient K equal to a bending coefficient K1 in a low temperature range of less than a Curie point according to the Example 2 and having no Curie point (having the bending coefficient K remaining unchanged) was assumed as a comparative example 2 to be compared with the Example 2. Similarly, a high-temperature bimetal having a bending coefficient K equal to a bending coefficient K1 in a low temperature range of less than a Curie point according to the Example 3 and having no Curie point (having the bending coefficient K remaining unchanged) was assumed as a comparative example 3 to be compared with the Example 3.

When a bending coefficient K was calculated, the bending coefficient K was separated into a bending coefficient K1 in a low temperature range of less than a Curie point and a bending coefficient K2 in a high temperature range of not less than the Curie point and calculated in a case of a sample having a Curie point according to each of the Examples 1 to 3. Specifically, the bending coefficient K1 in the low temperature range of less than the Curie point was calculated on the basis of a displacement D1 (=0) at the ordinary temperature T1 (25° C.) and a displacement D2 at 100° C. In other words, ΔT=75 (=100−25), ΔD=D2−D1 (=D2), t1=0.2 mm, and L=15 mm were substituted in the above expression (1), whereby the bending coefficient K1 in the low temperature range of less than the Curie point was calculated. The bending coefficient K2 in the high temperature range of not less than the Curie point was calculated on the basis of a displacement D3 at 250° C. and a displacement D4 at 300° C. In other words, ΔT=50 (=300−250), ΔD=D4−D3, t1=0.2 mm, and L=15 mm were substituted in the above expression (1), whereby the bending coefficient K2 in the high temperature range of not less than the Curie point was calculated.

When the bending coefficient K was calculated, the bending coefficient K was calculated on the basis of the displacement D1 (=0) at the ordinary temperature T1 (25° C.) and the displacement D2 at 100° C. in a case of a sample having no Curie point according to the comparative example 1. In other words, ΔT=75 (=100−25), ΔD=D2−D1 (=D2), t1=0.2 mm, and L=15 mm were substituted in the above expression (1), whereby the bending coefficient K was calculated.

Figure 8:
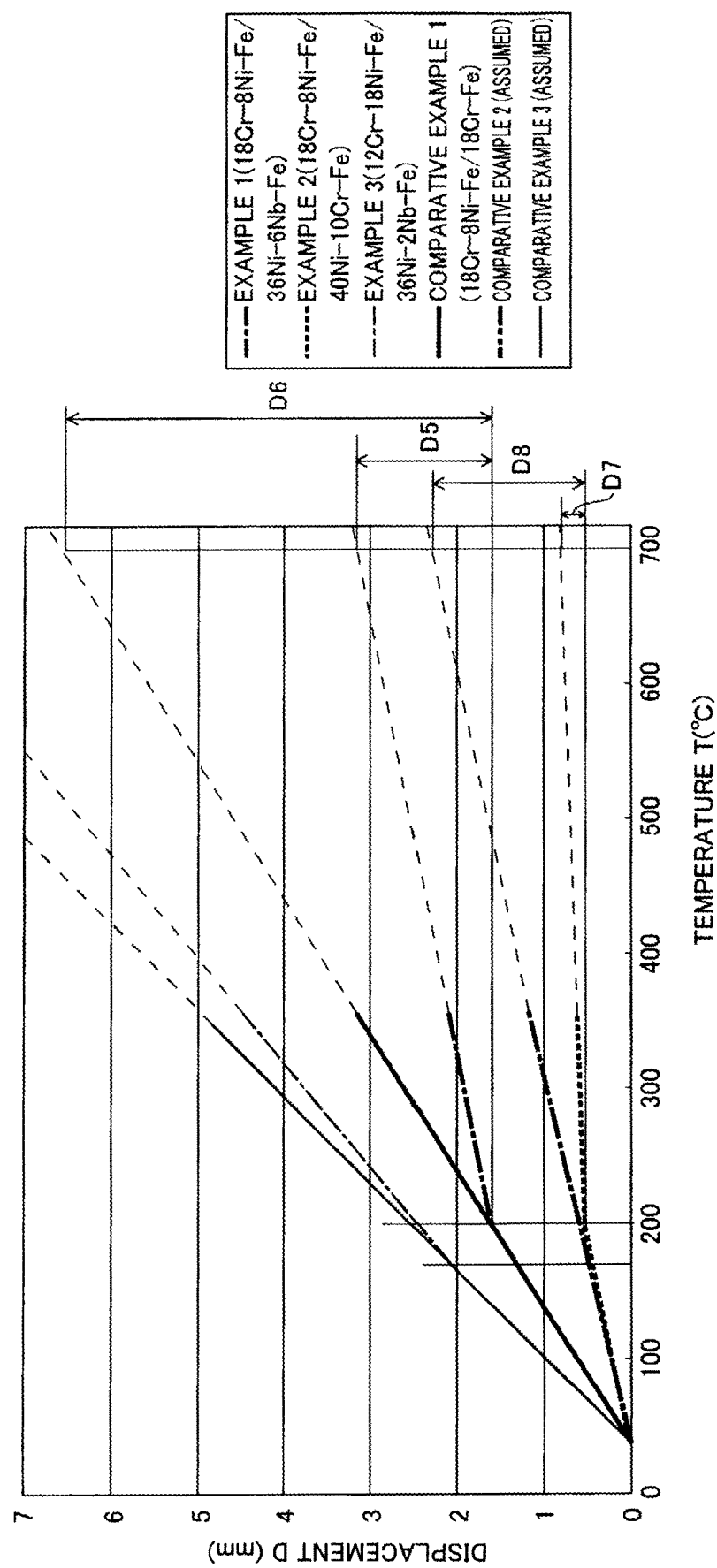
FIG. 8 A graph showing results of the measurement of a displacement conducted in order to confirm the effects of the present invention.

Experimental results of measurement of a displacement shown in FIGS. 7 to 10 showed that as for the Example 1, the high-temperature bimetal 301 according to the Example 1 was deformed by bending substantially similarly to the high-temperature bimetal 301 according to the comparative example 1 in the low temperature range of less than the Curie point (200° C.) shown in FIG. 7, as shown in FIG. 8. On the other hand, in the high temperature range of not less than the Curie point, the displacement D of deformation due to bending of the high-temperature bimetal 301 according to the Example 1 was small compared with that of the high-temperature bimetal 301 according to the comparative example 1. In other words, it has been confirmed that in the high temperature range of not less than the Curie point, the slope (displacement per unit temperature) of a graph of the displacement D of the high-temperature bimetal 301 according to the Example 1 is smaller than the slope (displacement per unit temperature) of a graph of the displacement D of the high-temperature bimetal 301 according to the comparative example 1.

Thus, it is presumed that at 700° C., which is an upper limit of an operating temperature range of the high-temperature bimetal 301 according to the Example 1, a difference (displacement of the Example 1 in the high temperature range) D5 between the displacement D of deformation due to bending of the high-temperature bimetal 301 according to the Example 1 at 700° C. and the displacement D of deformation due to bending of the high-temperature bimetal 301 according to the Example 1 at 200° C., which is the Curie point, is about one-third as compared with a difference (displacement of the comparative example 1 in the high temperature range) D6 between the displacement D of deformation due to bending of the high-temperature bimetal 301 according to the comparative example 1 at 700° C. and the displacement D of deformation due to bending of the high-temperature bimetal 301 according to the comparative example 1 at 200° C. Thus, it is presumed that in the high temperature range of not less than the Curie point, the high-temperature bimetal 301 according to the Example 1 can further inhibit an increase in thermal stress as compared with the high-temperature bimetal 301 according to the comparative example 1.

As for the Example 2, the high-temperature bimetal 301 according to the Example 2 was deformed by bending similarly to the assumed high-temperature bimetal according to the comparative example 2 in the low temperature range of less than the Curie point (200° C.) shown in FIG. 7, as shown in FIG. 8. On the other hand, in the high temperature range of not less than the Curie point, the displacement D of deformation due to bending of the high-temperature bimetal 301 according to the Example 2 was small compared with that of the assumed high-temperature bimetal according to the comparative example 2. In other words, it has been confirmed that in the high temperature range of not less than the Curie point, the slope (displacement per unit temperature) of a graph of the displacement D of the high-temperature bimetal 301 according to the Example 2 is smaller than the slope (displacement per unit temperature) of a graph of the displacement D of the assumed high-temperature bimetal according to the comparative example 2.

Thus, it is presumed that at 700° C., which is an upper limit of an operating temperature range of the high-temperature bimetal 301 according to the Example 2, a difference (displacement of the Example 2 in the high temperature range) D7 between the displacement D of deformation due to bending of the high-temperature bimetal 301 according to the Example 2 at 700° C. and the displacement D of deformation due to bending of the high-temperature bimetal 301 according to the Example 2 at 200° C., which is the Curie point, is about one-sixth as compared with a difference (displacement of the comparative example 2 in the high temperature range) D8 between the displacement D of deformation due to bending of the assumed high-temperature bimetal according to the comparative example 2 at 700° C. and the displacement D of deformation due to bending of the assumed high-temperature bimetal according to the comparative example 2 at 200° C. Thus, it is presumed that in the high temperature range of not less than the Curie point, the high-temperature bimetal 301 according to the Example 2 can further inhibit an increase in thermal stress as compared with the assumed high-temperature bimetal according to the comparative example 2.

As for the Example 3, the high-temperature bimetal 301 according to the Example 3 was deformed by bending similarly to the assumed high-temperature bimetal according to the comparative example 3 in the low temperature range of less than the Curie point (170° C.) shown in FIG. 7, as shown in FIG. 8. On the other hand, in the high temperature range of not less than the Curie point, the displacement D of deformation due to bending of the high-temperature bimetal 301 according to the Example 3 was small compared with that of the assumed high-temperature bimetal according to the comparative example 3. In other words, it has been confirmed that in the high temperature range of not less than the Curie point, the slope (displacement per unit temperature) of a graph of the displacement D of the high-temperature bimetal 301 according to the Example 3 is smaller than the slope (displacement per unit temperature) of a graph of the displacement D of the assumed high-temperature bimetal according to the comparative example 3. Thus, it is presumed that in the high temperature range of not less than the Curie point, the high-temperature bimetal 301 according to the Example 3 can further inhibit an increase in thermal stress as compared with the assumed high-temperature bimetal according to the comparative example 3.

Data of displacements D at prescribed temperatures T (100° C., 250° C., and 300° C.) shown in FIG. 9 was employed to calculate bending coefficients K shown in FIG. 10. Thus, it has been confirmable that in the high-temperature bimetal 301 according to the Example 1, the bending coefficient K2 ($3.3 \times 10^{-6}$/K) in the high temperature range of not less than the Curie point (200° C.) is smaller than the bending coefficient K1 ($6.7 \times 10^{-6}$/K) in the low temperature range of less than the Curie point. It has been confirmable that in the high-temperature bimetal 301 according to the Example 2, the bending coefficient K2 ($1.1 \times 10^{-6}$/K) in the high temperature range of not less than the Curie point (200° C.) is smaller than the bending coefficient K1 ($2.3 \times 10^{-6}$/K)

in the low temperature range of less than the Curie point. It has been confirmable that in the high-temperature bimetal 301 according to the Example 3, the bending coefficient K2 ($6.5 \times 10^{-6}$/K) in the high temperature range of not less than the Curie point (170° C.) is smaller than the bending coefficient K1 ($11.9 \times 10^{-6}$/K) in the low temperature range of less than the Curie point.

(Measurement of Oxidation Mass Increase)

Secondly, measurement of an oxidation mass increase is described. In this measurement of an oxidation mass increase, a high-temperature bimetal having a thickness of 0.2 mm, a width of 1.0 cm, and a length of 3.0 cm, constituted by a high thermal expansion layer and a low thermal expansion layer was employed to perform the measurement. In the measurement of an oxidation mass increase, the masses of samples after heat treatment by holding the samples for 15 hours at 500° C., 600° C., and 700° C. (highest acceptable temperature) were measured. An oxidation mass increase was calculated with the following expression (2):

$$\text{oxidation mass increase} = (\text{mass after heat treatment} - \text{mass before heat treatment}) / (1.0 \text{ cm} \times 3.0 \text{ cm}) \quad (2)$$

In the measurement of an oxidation mass increase, the Example 1 (SUS304/36Ni-6Nb—Fe alloy), the Example 2 (SUS304/40Ni-10Cr—Fe alloy), and the Example 3 (12Cr-18Ni—Fe alloy/36Ni-2Nb—Fe alloy) employed in the aforementioned measurement of a displacement and the comparative example 1 (SUS304/18Cr—Fe alloy) employed to be compared with the Example 1 in the aforementioned measurement of a displacement each were employed as a high-temperature bimetal. On the other hand, a bimetal having a high thermal expansion layer made of a 23Ni-5Mn—Fe alloy containing 23 mass % of Ni, 5 mass % of Mn, Fe, and trace unavoidable impurities and a low thermal expansion layer made of a 36Ni—Fe alloy containing 36 mass % of Ni, Fe, and trace unavoidable impurities was employed as a comparative example 4. A bimetal having a high thermal expansion layer made of a 20Ni-6Cr—Fe alloy containing 20 mass % of Ni, 6 mass % of Cr, Fe, and trace unavoidable impurities and a low thermal expansion layer made of a 36Ni—Fe alloy was employed as a comparative example 5. A bimetal having a high thermal expansion layer made of a 20Ni-6Cr—Fe alloy and a low thermal expansion layer made of a 42Ni—Fe alloy containing 42 mass % of Ni, Fe, and trace unavoidable impurities was employed as a comparative example 6.

If an oxidation mass increase is more than 1.5 mg (acceptable value) per cubic centimeter, an increase in the thickness of a high-temperature bimetal due to oxidation is more than 2 μm and exceeds 1% of the total thickness (0.2 mm) of the high-temperature bimetal before the oxidation. Thus, if the oxidation mass increase is more than 1.5 mg per cubic centimeter, the property (bending coefficient K or the like) of the high-temperature bimetal changes to such an extent that a practical problem is caused.

Experimental results of measurement of an oxidation mass increase shown in FIG. 11 showed that the oxidation mass increases of the high-temperature bimetals according to the Examples 1, 2, and 3 and the comparative example 1 and the bimetals according to the comparative examples 4 to 6 were not more than 1.5 mg per cubic centimeter when the high-temperature bimetals and the bimetals were heat-treated at 500° C. and 600° C. However, when the high-temperature bimetals and the bimetals were heat-treated at 700° C. (highest acceptable temperature), the oxidation mass increases of the high-temperature bimetals according to the Examples 1, 2, and 3 and the comparative example 1 were not more than 1.5 mg (Example 1: 1.03 mg, Example 2: 0.26 mg, Example 3: 1.38 mg, comparative example 1: 0.07 mg) per cubic centimeter whereas the bimetals according to the comparative examples 4 to 6 were more than 1.5 mg (comparative example 4: 2.83 mg, comparative example 5: 2.01 mg, comparative example 6: 2.09 mg) per cubic centimeter. Thus, it is presumed that the properties (bending coefficients K or the like) of the high-temperature bimetals according to the Examples 1, 2, and 3 and the comparative example 1 do not change to such an extent that a practical problem is caused whereas the properties of the bimetals according to the comparative examples 4 to 6 change to such an extent that a practical problem is caused, if the temperature rises to the highest acceptable temperature (700° C.)

It is presumed that the oxidation mass increase of the high-temperature bimetal according to the Example 1 was not more than 1.5 mg per cubic centimeter because the high thermal expansion layer made of the SUS304 contained Cr and the low thermal expansion layer made of the 36Ni-6Nb—Fe alloy contained Nb thereby improving the oxidation resistance of each of the high thermal expansion layer and the low thermal expansion layer. It is presumed that the oxidation mass increase of the high-temperature bimetal according to the Example 2 was not more than 1.5 mg per cubic centimeter because the high thermal expansion layer made of the SUS304 and the low thermal expansion layer made of the 40Ni-10Cr—Fe alloy each contained Cr thereby improving the oxidation resistance of each of the high thermal expansion layer and the low thermal expansion layer. It is presumed that the oxidation mass increase of the high-temperature bimetal according to the Example 3 was not more than 1.5 mg per cubic centimeter because the high thermal expansion layer made of the 12Cr-18Ni—Fe alloy contained Cr and the low thermal expansion layer made of the 36Ni-2Nb—Fe alloy contained Nb thereby improving the oxidation resistance of each of the high thermal expansion layer and the low thermal expansion layer.

It is presumed that the oxidation mass increase of the high-temperature bimetal according to the comparative example 1 was not more than 1.5 mg (0.07 mg) per cubic centimeter because the high thermal expansion layer made of the SUS304 and the low thermal expansion layer made of the 18Cr—Fe alloy each contained Cr thereby improving the oxidation resistance of each of the high thermal expansion layer and the low thermal expansion layer.

It is presumed from the aforementioned results of measurement of a displacement and measurement of an oxidation mass increase that in the high temperature range of not less than the Curie point (200° C.), the high-temperature bimetal according to the Example 1 constituted by the high thermal expansion layer made of SUS304 and the low thermal expansion layer made of the 36Ni-6Nb—Fe alloy can further inhibit an increase in thermal stress as compared with the high-temperature bimetal according to the comparative example 1 having no Curie point while the property (bending coefficient K or the like) of the high-temperature bimetal does not change to such an extent that a practical problem is caused even if the temperature rises to the highest acceptable temperature (700° C.). Thus; it has been confirmable that accumulation of thermal stress in the high-temperature bimetal according to the Example 1 can be inhibited in the high temperature range of not less than the Curie point (200° C.) while the property of the high-temperature bimetal can be inhibited from changing to such an extent that a practical problem is caused.

It is presumed that in the high temperature range of not less than the Curie point (200° C.), the high-temperature bimetal according to the Example 2 constituted by the high thermal expansion layer made of SUS304 and the low thermal expansion layer made of the 40Ni-10Cr—Fe alloy can further inhibit an increase in thermal stress as compared with the assumed high-temperature bimetal according to the comparative example 2 having no Curie point while the property (bending coefficient K or the like) of the high-temperature bimetal do not change to such an extent that a practical problem is caused even if the temperature rises to the highest acceptable temperature (700° C.). Thus, it has been confirmable that accumulation of thermal stress in the high-temperature bimetal according to the Example 2 can be inhibited in the high temperature range of not less than the Curie point (200° C.) while the property of the high-temperature bimetal can be inhibited from changing to such an extent that a practical problem is caused.

It is presumed that in the high temperature range of not less than the Curie point (170° C.), the high-temperature bimetal according to the Example 3 constituted by the high thermal expansion layer made of the 12Cr-18Ni—Fe alloy and the low thermal expansion layer made of the 36Ni-2Nb—Fe alloy can further inhibit an increase in thermal stress as compared with the assumed high-temperature bimetal according to the comparative example 3 having no Curie point while the property (bending coefficient K or the like) of the high-temperature bimetal do not change to such an extent that a practical problem is caused even if the temperature rises to the highest acceptable temperature (700° C.). Thus, it has been confirmable that accumulation of thermal stress in the high-temperature bimetal according to the Example 3 can be inhibited in the high temperature range of not less than the Curie point (170° CY while the property of the high-temperature bimetal can be inhibited from changing to such an extent that a practical problem is caused.

The embodiments and Examples disclosed this time must be considered as illustrative in all points and not restrictive. The range of the present invention is shown not by the above description of the embodiments and Examples but by the scope of claims for patent, and all modifications within the meaning and range equivalent to the scope of claims for patent are included.

For example, while the example of making the high thermal expansion layer 2 of the SUS304 (18Cr-8Ni—Fe alloy) has been shown in each of the aforementioned first and second embodiments and the example of making the high thermal expansion layer 202 of the 12Cr-18Ni—Fe alloy has been shown in the aforementioned third embodiment, the present invention is not restricted to this, but the high thermal expansion layer may be SUS305 ((17 to 19)Cr-(8 to 10.5)Ni—Fe alloy), for example, as long as the same is austenitic stainless steel.

While the example of making the low thermal expansion layer 3 of the 36Ni-6Nb—Fe alloy has been shown in the aforementioned first embodiment, the example of making the low thermal expansion layer 103 of the 40Ni-10Cr—Fe alloy has been shown in the aforementioned second embodiment, and the example of making the low thermal expansion layer 203 of the 36Ni-2Nb—Fe alloy has been shown in the aforementioned third embodiment, the present invention is not restricted to this, but there is no particular limitation on the low thermal expansion layer as long as the same is a thermosensitive magnetic metal. The thermosensitive magnetic metal of the low thermal expansion layer can have a Curie point of at least about 100° C. by containing at least about 32 mass % of Ni. Further, the thermosensitive magnetic metal of the low thermal expansion layer can have a Curie point of not more than about 400° C. by containing not more than about 45 mass % of Ni. Therefore, the thermosensitive magnetic metal of the low thermal expansion layer is preferably a Ni—Fe alloy containing at least about 32 mass % and not, more than about 45 mass % of Ni.

While the example of making the low thermal expansion layer 3 of the 36Ni-6Nb—Fe alloy has been shown in the aforementioned first embodiment, the example of making the low thermal expansion layer 103 of the 40Ni-10Cr—Fe alloy has been shown in the aforementioned second embodiment, and the example of making the low thermal expansion layer 203 of the 36Ni-2Nb—Fe alloy has been shown in the aforementioned third embodiment, the present invention is not restricted to this, but the thermosensitive magnetic metal of the low thermal expansion layer may be a Ni—Fe alloy containing at least about 32 mass % and not more than about 45 mass % of Ni to which at least one of Nb, Cr, Al, Si, and Ti is added. At this time, Al is preferably added in the range of at least about 1 mass % to not more than about 5 mass % if Al is added to the Ni—Fe alloy. The reason is as follows. At least about 1 mass % of Al is added to the Ni—Fe alloy, whereby the oxidation resistance of the thermosensitive magnetic metal can be improved. Further, not more than about 5 mass % of Al is added to the Ni—Fe alloy, whereby a reduction in the workability of the thermosensitive magnetic metal due to an excessive increase in the strength of the thermosensitive magnetic metal can be inhibited.

In the thermosensitive magnetic metal of the low thermal expansion layer, Si is preferably added in the range of at least about 1 mass % to not more than about 5 mass % if Si is added to the Ni—Fe alloy. The reason is as follows. At least about 1 mass % of Si is added to the Ni—Fe alloy, whereby the oxidation resistance of the thermosensitive magnetic metal can be improved. Further, not more than about 5 mass % of Si is added to the Ni—Fe alloy, whereby a reduction in the workability of the thermosensitive magnetic metal due to an excessive increase in the strength of the thermosensitive magnetic metal can be inhibited.

In the thermosensitive magnetic metal of the low thermal expansion layer, Ti is preferably added in the range of at least about 0.2 mass % to not more than about 1 mass % if Ti is added to the Ni—Fe alloy. The reason is as follows. At least about 0.2 mass % of Ti is added to the Ni—Fe alloy, whereby the oxidation resistance of the thermosensitive magnetic metal can be improved. Further, not-more than about 1 mass % of Ti is added to the Ni—Fe alloy, whereby a reduction in the workability of the thermosensitive'magnetic metal due to an excessive increase in the strength of the thermosensitive magnetic metal can be inhibited.

While the example of making the low thermal expansion layer 3 of the 36Ni-6Nb—Fe alloy has been shown in the aforementioned first embodiment and the example of making the low thermal expansion layer 203 of the 36Ni-2Nb—Fe alloy has been shown in the aforementioned third embodiment, the present invention is not restricted to this, but the thermosensitive magnetic metal of the low thermal expansion layer may be a Ni—Fe alloy containing at least about 32 mass % and not more than about 45 mass % of Ni to which Nb is added in the range of at least about 2 mass % to not more than about 8 mass %.

While the example of making the low thermal expansion layer 103 of the 40Ni-10Cr—Fe alloy has been shown in the aforementioned second embodiment, the present invention is not restricted to this, but the thermosensitive magnetic metal of the low thermal expansion layer may be a Ni—Fe alloy containing at least about 32 mass % and not more than about 45 mass % of Ni to which Cr is added in the range of at least about 2 mass % to not more than about 13 mass %.

While the example where the proportion of the thickness t3 of the 36Ni-6Nb—Fe alloy of the low thermal expansion layer 3 to the total thickness t1 of the high-temperature bimetal 1 is about 0.53 has been shown in the aforementioned first embodiment, the present invention is not restricted to this, but the proportion of the thickness of the 36Ni-6Nb—Fe alloy of the low thermal expansion layer to the total thickness of the high-temperature bimetal may be at least about 0.48 and not more than about 0.58. According to this structure, fluctuation ranges of the bending coefficients K1 and K2 in a case where the proportion of the thickness of the 36Ni-6Nb—Fe alloy is at least about 0.48 and not more than about 0.58 can be suppressed to not more than about 3% of the bending coefficients K1 and K2 in a case where the proportion of the thickness of the 36Ni-6Nb—Fe alloy is an optimum proportion (about 0.53). The proportion of the thickness of the 36Ni-6Nb—Fe alloy of the low thermal expansion layer to the total thickness of the high-temperature bimetal is preferably larger than about 0.50.

While the example where the proportion of the thickness t3 of the 40Ni-10Cr—Fe alloy of the low thermal expansion layer 103 to the total thickness ti of the high-temperature bimetal 101 is about 0.55 has been shown in the aforementioned second embodiment, the present invention is not restricted to this, but the proportion of the thickness of the 40Ni-10Cr—Fe alloy of the low thermal expansion layer to the total thickness of the high-temperature bimetal may be at least about 0.50 and not more than about 0.60. According to this structure, fluctuation ranges of the bending coefficients K1 and K2 in a case where the proportion of the thickness of the 40Ni-10Cr—Fe alloy is at least about 0.50 and not more than about 0.60 can be suppressed to not more than about 3% of the bending coefficients K1 and K2 in a case where the proportion of the thickness of the 40Ni-10Cr—Fe alloy is an optimum proportion (about 0.55). The proportion of the thickness of the 40Ni-10Cr—Fe alloy of the low thermal expansion layer to the total thickness of the high-temperature bimetal is preferably larger than about 0.50.

While the example where the lower limit of the operating temperature range in which the high-temperature bimetal 1 (101, 201) can be employed is about −70° C. has been shown in each of the aforementioned first to third embodiments, the present invention is not restricted to this, but the lower limit of the operating temperature range in which the high-temperature bimetal can be employed may not necessarily be about −70° C. but may be higher than about −70° C. or lower than about −70° C.

While the example of rendering the thickness t2 of the high thermal expansion layer 2 (202) smaller than the thickness t3 of the low thermal expansion layer 3 (103, 203) has been shown in each of the aforementioned first to third embodiments, the present invention is not restricted to this, but the thickness of the high thermal expansion layer may be substantially equal to or larger than the thickness of the low thermal expansion layer.

While the example where the high-temperature bimetal 1 (101, 201) has the thickness t1 of about 0.2 mm has been shown in each of the aforementioned first to third embodiments, the present invention is not restricted to this, but the thickness of the high-temperature bimetal may be larger than about 0.2 mm or less than about 0.2 mm.

While the example where the prescribed set temperature T2 is close to the Curie point (about 200° C., about 170° C.) of the low thermal expansion layer 3 (103, 203) of the high-temperature bimetal 1 (101, 201) and higher than the Curie point has been shown in each of the aforementioned first to third embodiments, the present invention is not restricted to this, but the set temperature T2 may not be close to the Curie point or may not be higher than the Curie point.

The invention claimed is:

1. A thermosensitive deformation apparatus comprising:
a high-temperature bimetal plate made of a two-layered cladding material consisting of
a single high thermal expansion layer made of austenitic stainless steel, and
a single low thermal expansion layer made of a thermosensitive magnetic metal having a Curie point and pressure-bonded directly to said single high thermal expansion layer, wherein a thermal expansion coefficient of the single high thermal expansion layer is higher than a thermal expansion coefficient of the single low thermal expansion layer; and
a fixing member fixing an end of the high-temperature bimetal plate,
wherein opposite end of the high-temperature bimetal plate is a free end which is not fixed,
wherein a range of an operating temperature is over both a high temperature range of not less than said Curie point and a low temperature range of less than said Curie point, wherein an upper limit of operating temperatures in said high temperature range of not less than said Curie point is at least 500° C.,
wherein said high-temperature bimetal plate is formed to bend resulting from a deformation by rising temperature,
wherein a bending coefficient in said high temperature range of not less than said Curie point is smaller than a bending coefficient in said low temperature range of less than said Curie point,
a range of said operating temperatures in said high temperature range of not less than said Curie point is larger than a range of operating temperatures in said low temperature range of less than said Curie point, and
a thickness of said single low thermal expansion layer is larger than a thickness of said single high thermal expansion layer.

2. The thermosensitive deformation apparatus according to claim 1, wherein said Curie point of said thermosensitive magnetic metal of said low thermal expansion layer is at least 100° C. and not more than 400° C., and said upper limit of said operating temperatures in said high temperature range of not less than said Curie point is at least 500° C. and not more than 700° C.

3. The thermosensitive deformation apparatus according to claim 1, wherein said thermosensitive magnetic metal of said low thermal expansion layer is a Ni—Fe alloy.

4. The thermosensitive deformation apparatus according to claim 3, wherein said thermosensitive magnetic metal of said low thermal expansion layer is a Ni—Fe alloy containing at least 32 mass % and not more than 45 mass % of Ni.

5. The thermosensitive deformation apparatus according to claim 4, wherein said thermosensitive magnetic metal of said low thermal expansion layer is formed by adding at least one of Nb, Cr, Al, Si, and Ti to said Ni—Fe alloy.

6. The thermosensitive deformation apparatus according to claim 5, wherein said thermosensitive magnetic metal of said low thermal expansion layer is formed by adding at least 2 mass % and not more than 8 mass % of Nb to said Ni—Fe alloy.

7. The thermosensitive deformation apparatus according to claim 6, wherein said thermosensitive magnetic metal of said low thermal expansion layer is formed by adding 6 mass % of Nb to a Ni—Fe alloy containing 36 mass % of Ni.

8. The thermosensitive deformation apparatus according to claim 6, wherein said thermosensitive magnetic metal of said low thermal expansion layer is formed by adding 2 mass % of Nb to a Ni—Fe alloy containing 36 mass % of Ni.

9. The thermosensitive deformation apparatus according to claim 1, wherein a thermal expansion coefficient of said low thermal expansion layer in said high temperature range of not less than said Curie point is smaller than a thermal expansion coefficient of said high thermal expansion layer and larger than a thermal expansion coefficient of said low thermal expansion layer in said low temperature range of less than said Curie point.

10. The thermosensitive deformation apparatus according to claim 9, wherein said thermal expansion coefficient of said low thermal expansion layer in said high temperature range of not less than said Curie point is at least twice said thermal expansion coefficient of said low thermal expansion layer in said low temperature range of less than said Curie point.

11. The thermosensitive deformation apparatus according to claim 1, wherein a thermal expansion coefficient of said low thermal expansion layer in said low temperature range of less than said Curie point is not more than 50% of a thermal expansion coefficient of said high thermal expansion layer.

* * * * *